US011681536B2

(12) United States Patent
Zhang et al.

(10) Patent No.: US 11,681,536 B2
(45) Date of Patent: Jun. 20, 2023

(54) FAST BOOT SYSTEMS AND METHODS FOR PROGRAMMABLE LOGIC DEVICES

(71) Applicant: Lattice Semiconductor Corporation, Hillsboro, OR (US)

(72) Inventors: Fulong Zhang, Cupertino, CA (US); John Gordon Hands, San Jose, CA (US); Wei Han, Portland, OR (US); Mark Everhard, San Jose, CA (US)

(73) Assignee: Lattice Semiconductor Corporation, Hillsboro, OR (US)

( * ) Notice: Subject to any disclaimer, the term of this patent is extended or adjusted under 35 U.S.C. 154(b) by 0 days.

(21) Appl. No.: 16/706,591

(22) Filed: Dec. 6, 2019

(65) Prior Publication Data

US 2021/0173669 A1 Jun. 10, 2021

(51) Int. Cl.
*G06F 9/445* (2018.01)
*G06F 1/26* (2006.01)
*G06F 9/4401* (2018.01)

(52) U.S. Cl.
CPC ............ *G06F 9/44505* (2013.01); *G06F 1/26* (2013.01); *G06F 9/4401* (2013.01)

(58) Field of Classification Search
None
See application file for complete search history.

(56) References Cited

U.S. PATENT DOCUMENTS

| 5,790,468 A | * | 8/1998 | Oh ......................... G11C 29/02 365/222 |
| 6,147,509 A | | 11/2000 | Oku |
| 7,424,398 B2 | * | 9/2008 | Booth .................. G06F 21/575 702/186 |
| 7,518,396 B1 | | 4/2009 | Kondapalli et al. |
| 7,631,223 B1 | | 12/2009 | Spinti et al. |
| 8,786,310 B1 | | 7/2014 | Lu et al. |
| 9,590,635 B1 | | 3/2017 | Sengupta |

(Continued)

FOREIGN PATENT DOCUMENTS

| EP | 2523349 | 11/2012 |
| KR | 20180063128 | 6/2018 |

OTHER PUBLICATIONS

Meyer et al., "Embedded Systems Start-up under Timing Constraints on Modem FPGAs", 21$^{st}$ International Conference on Field Programmable Logic and Applications, 2011, 7 pages. IEEE.

(Continued)

*Primary Examiner* — Paul Yen
(74) *Attorney, Agent, or Firm* — Haynes and Boone, LLP

(57) ABSTRACT

Various techniques are provided to implement fast boot for programmable logic devices (PLDs). In one example, a method includes performing a read operation on a non-volatile memory to obtain a first value. The method further includes comparing the value to a predetermined value to obtain a comparison result. The method further includes determining whether a boot image stored on the non-volatile memory is to be read based at least on the first comparison result. The method further includes performing, based on the determining, a read operation on the boot image to obtain data associated with booting of a device. The method further includes booting the device based at least on the data. Related systems and devices are provided.

19 Claims, 16 Drawing Sheets

(56) References Cited

U.S. PATENT DOCUMENTS

| | | | |
|---|---|---|---|
| 2014/0075169 A1* | 3/2014 | Andrews | G06F 8/60 |
| | | | 713/2 |
| 2014/0223198 A1 | 8/2014 | Saranghar et al. | |
| 2015/0199520 A1* | 7/2015 | Woolley | G06F 21/575 |
| | | | 713/2 |
| 2015/0277930 A1 | 10/2015 | Sarangdhar et al. | |
| 2015/0356299 A1* | 12/2015 | Barkelew | G06F 21/575 |
| | | | 713/2 |
| 2016/0321662 A1* | 11/2016 | Arnold | G09C 1/00 |
| 2019/0278914 A1 | 9/2019 | Incorporated | |

OTHER PUBLICATIONS

Wang et al., "An FPGA Configuration Circuit Used for Fast and Partial Configuration", School of Microelectronics, Fudan University, 2007, 4 pages, IEEE.

\* cited by examiner

FAST BOOT SYSTEMS AND METHODS FOR PROGRAMMABLE LOGIC DEVICES

CROSS-REFERENCE TO RELATED APPLICATIONS

This application is related to U.S. patent application Ser. No. 16/228,647 filed on Dec. 20, 2018 and entitled "FAST BOOT SYSTEMS AND METHODS FOR PROGRAMMABLE LOGIC DEVICES," which claims the benefit of and priority to U.S. Provisional Patent Application No.: 62/612,265 filed on Dec. 29, 2017 and entitled "FAST BOOT SYSTEMS AND METHODS FOR PROGRAMMABLE LOGIC DEVICES," each of which is hereby incorporated by reference in its entirety.

TECHNICAL FIELD

The present invention relates generally to programmable logic devices and, more particularly, to fast boot techniques for such devices.

BACKGROUND

Programmable logic devices (PLDs) (e.g., field programmable gate arrays (FPGAs), complex programmable logic devices (CPLDs), field programmable systems on a chip (FPSCs), or other types of programmable devices) may be configured with various user designs to implement desired functionality. Typically, the user designs are synthesized and mapped into configurable resources, including by way of non-limiting example programmable logic gates, look-up tables (LUTs), embedded hardware, interconnections, and/or other types of resources, available in particular PLDs. Physical placement and routing for the synthesized and mapped user designs may then be determined to generate configuration data for the particular PLDs. The generated configuration data is loaded into configuration memory of the PLDs to implement the programmable logic gates, LUTs, embedded hardware, interconnections, and/or other types of configurable resources. The loading of the configuration data may take a considerable amount of time. Therefore, improved techniques for the loading of configuration data and PLD operation are desired.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
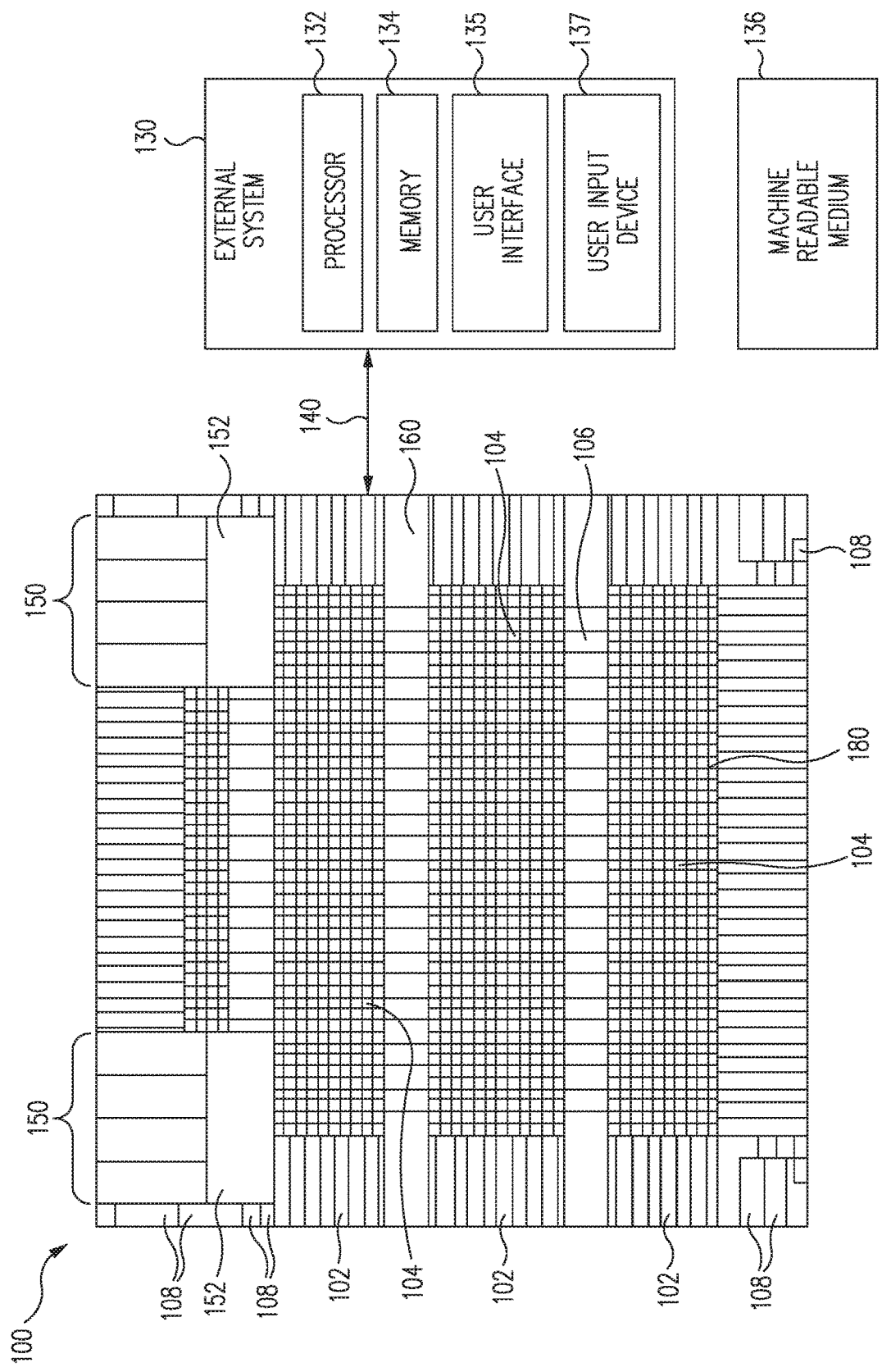
FIG. 1 illustrates a block diagram of a PLD in accordance with an embodiment of the disclosure.

Various techniques are provided to facilitate fast boot for PLDs. In some embodiments, a PLD may be implemented with fast boot capability to allow at least a portion of an input/output (I/O) fabric of the PLD to provide I/O functionality. Fast boot may also be referred to as fast wake up, fast activation, early boot, early wake up, early activation, or variant thereof. In some cases, alternatively or in addition, a portion of a logic fabric and/or other components of the PLD may be designated for fast boot. To this end, some functionality (e.g., I/O and/or logic functionality) of the PLD may be designated for fast boot.

In an embodiment, to facilitate fast boot, configuration data associated with a portion of the I/O fabric designated for fast boot may be loaded into configuration memory cells associated with the portion of the I/O fabric. Once the configuration memory cells have been configured (e.g., programmed, loaded with configuration data), a wakeup signal may be provided to wake up (e.g., also referred to as activate) I/O functionality associated with the portion of the I/O fabric. In waking up the I/O functionality, the I/O functionality transitions from a configuration mode to a fast boot operation mode.

After the portion of the I/O fabric has been activated, remaining configuration memory cells of the PLD, which may include the logic fabric and any remaining portion of the I/O fabric, may be configured with corresponding configuration data and activated. Once all of the configuration data is loaded into the PLD, the PLD can wake up and provide functionality. In waking up the remaining functionality of the PLD, the functionality transitions to a full system operation mode (e.g., also referred to as normal operation mode). In an aspect, the I/O functionality designated for fast boot may transition from the fast boot operation mode to the full system operation mode, whereas the remaining functionality (e.g., functionality not designated for fast boot) may transition from the configuration mode to the full system operation mode. Alternatively or in addition to designating at least some I/O functionality for fast boot, logic functionality and/or other components of the PLD may be designated for fast boot.

The configuration data may be provided as a configuration bitstream. Configuration time for configuring (e.g., loading configuration data into) a PLD may be based on a configuration method, bitstream source, link speed of a bitstream (e.g., including the configuration bitstream) to be written into the PLD, and/or other factors. Prior to configuring the PLD using the configuration bitstream, the I/O fabric and logic fabric of the PLD may be in an unknown state or tri-stated state (e.g., aside from any hardcoded components of the PLD which are generally in a defined state at power on).

In providing fast boot of the I/O functionality, the PLD may provide predictable I/O behavior (e.g., I/O functionality) soon after powering up a device, without waiting for the entire PLD to be configured and activated prior to providing such I/O behavior. Such a device may include the PLD and/or may be controlled by the PLD. An example of a device may be a fan or a light emitting diode (LED). In this regard, the I/O functionality that is activated may drive proper polarity (e.g., on or off, 1 or 0) with desired driver characteristics (e.g., I/O type, drive strength, pull up/down feature, etc.) to devices controlled by the PLD.

In some user-specified applications, a delay associated with providing the I/O behavior may adversely affect user and/or consumer experience and/or otherwise be undesirable. For example, LEDs controlled by the PLD may have undefined behavior (e.g., due to the undefined I/O functionality), which may be experienced as flickering or generally any misbehavior of the LEDs prior to the functionality being activated (e.g., placed in a defined state). By providing fast boot to allow early wake up of the I/O behavior of the PLD associated with the LEDs, the LEDs may receive appropriate control signals to define behavior of the LEDs. In these user-specified applications, other functionality of the PLD may be considered to be less critical, less time-sensitive, and/or less apparent and thus may be activated at a later time. As an example, in a case that the entire PLD is configured and activated in tens or hundreds of milliseconds, the portions of the PLD designated for fast boot may be configured and activated in the microseconds range (e.g., 1 µs-1,000 µs). Time associated with configuration and activation for fast boot operation may be based at least in part on the amount of I/O and/or logic functionality designated for fast boot.

In some aspects, such I/O functionality provided by the PLD may be referred to as static state control, and fast boot of such I/O functionality may be referred to as fast boot static state control. Static state control may provide control to component coupled to the PLD that is generally independent of the PLD's logic fabric. In some cases, fast boot may be applied to a portion of the logic fabric of the PLD that controls I/O functionality. In these cases, the fast boot may facilitate static state control (e.g., I/O fabric-based control independent of logic fabric) and/or logic fabric controlled I/O.

In an embodiment, security may be enabled for at least a portion of the configuration data. To enable security, one or more authentication certificates may be generated. In some cases, one or more authentication certificates may be provided for configuration data associated with fabric (e.g., I/O and/or logic functionality) designated for fast boot, and/or one or more authentication certificates may be provided for configuration data not designated for fast boot. Authentication may be performed based on the authentication certificate(s) before or after corresponding configuration data has been loaded into the PLD. For example, when a portion of the I/O fabric is designated for fast boot, a portion of the configuration data may be loaded into configuration memory cells associated with the portion of the I/O fabric. An authentication may be performed based on an authentication certificate(s) associated with the portion of the configuration data. If the authentication is successful, functionality associated with the portion of the I/O fabric can be activated and remaining configuration data loaded into the PLD. If the authentication is not successful, the configuration and activation of the PLD may be aborted.

Using various embodiments, portions of I/O and/or logic functionality of the PLD may be configured and activated to provide a stable, controlled state, prior to configuring and activating other functionality. In some cases, at least some I/O functionality may be designated for fast boot to effectuate a low I/O wakeup time of the PLD with respect to such I/O functionality. In some aspects, once the remainder of the PLD is configured and activated, seamless (e.g., glitchless) transition from a fast boot operation mode to a full system operation mode may be provided.

Referring now to the figures, FIG. 1 illustrates a block diagram of a PLD 100 in accordance with an embodiment of the disclosure. The PLD 100 (e.g., an FPGA, a CPLD, an FPSC, or other type of programmable device) generally includes I/O blocks 102 and programmable logic blocks (PLBs) 104. In some cases, the PLD 100 may generally be any type of programmable device (e.g., programmable integrated circuit) with distributed configuration, which may involve loading configuration data through pins, shifting to appropriate locations in associated fabric, and configuring configuration memory cells. The PLBs may also be referred to as logic blocks, programmable functional units (PFUs), or programmable logic cells (PLCs). In an aspect, the PLBs 104 may collectively form an integrated circuit (IC) core or logic core of the PLD 100. The I/O blocks 102 provide I/O functionality (e.g., to support one or more I/O and/or memory interface standards) for the PLD 100, while the PLBs 104 provide logic functionality (e.g., LUT-based logic) for the PLD 100. Additional I/O functionality may be provided by serializer/deserializer (SERDES) blocks 150 and physical coding sublayer (PCS) blocks 152. The PLD 100 may also include hard intellectual property core (IP) blocks 160 to provide additional functionality (e.g., substantially predetermined functionality provided in hardware which may be configured with less programming than the PLBs 104).

The PLD 100 may include blocks of memory 106 (e.g., blocks of erasable programmable read-only memory (EE-PROM), block static RAM (SRAM), and/or flash memory), clock-related circuitry 108 (e.g., clock sources, phase-locked loop (PLL) circuits, and/or delay-locked loop (DLL) circuits), and/or various routing resources 180 (e.g., interconnect and appropriate switching circuits to provide paths for routing signals throughout the PLD 100, such as for clock signals, data signals, control signals, wakeup signals, or others) as appropriate. The PLD 100 may include configuration and activation logic to receive configuration data, configure various programmable elements of the PLD 100, and activate functionality associated with these programmable elements. In general, the various elements of the PLD 100 may be used to perform their intended functions for desired applications, as would be understood by one skilled in the art.

For example, certain of the I/O blocks 102 may be used for programming the memory 106 or transferring information (e.g., various types of user data and/or control signals) to/from the PLD 100. Other of the I/O blocks 102 include a first programming port (which may represent a central processing unit (CPU) port, a peripheral data port, a serial peripheral interface (SPI) interface, and/or a sysCONFIG programming port) and/or a second programming port such as a joint test action group (JTAG) port (e.g., by employing standards such as Institute of Electrical and Electronics Engineers (IEEE) 1149.1 or 1532 standards). In various embodiments, the I/O blocks 102 may be included to receive configuration data and commands (e.g., over one or more connections) to configure the PLD 100 for its intended use and to support serial or parallel device configuration and information transfer with the SERDES blocks 150, PCS blocks 152, hard IP blocks 160, and/or PLBs 104 as appropriate.

It should be understood that the number and placement of the various elements are not limiting and may depend upon the desired application. For example, various elements may not be required for a desired application or design specification (e.g., for the type of programmable device selected).

Furthermore, it should be understood that the elements are illustrated in block form for clarity and that various elements would typically be distributed throughout the PLD 100, such as in and between the PLBs 104, hard IP blocks 160, and routing resources 180 to perform their conventional functions (e.g., storing configuration data that configures the PLD 100 or providing interconnect structure within the PLD 100). For example, the routing resources 180 may be used for internal connections within each PLB 104 and/or between different PLBs 104. It should also be understood that the various embodiments disclosed herein are not limited to programmable logic devices, such as the PLD 100, and may be applied to various other types of programmable devices, as would be understood by one skilled in the art.

An external system 130 may be used to create a desired user configuration or design of the PLD 100 and generate corresponding configuration data to program (e.g., configure) the PLD 100. For example, to configure the PLD 100, the system 130 may provide such configuration data to one or more of the I/O blocks 102, PLBs 104, SERDES blocks 150, and/or other portions of the PLD 100. In this regard, the external system 130 may include a link 140 that connects to a programming port (e.g., SPI, JTAG) of the PLD 100 to facilitate transfer of the configuration data from the external system 130 to the PLD 100. As a result, the I/O blocks 102, PLBs 104, various of the routing resources 180, and any other appropriate components of the PLD 100 may be configured to operate in accordance with user-specified applications. In some cases, the I/O blocks 102 or portion thereof may be designated for fast boot. In some cases, the PLBs 104 or portion thereof may be designated for fast boot.

In the illustrated embodiment, the system 130 is implemented as a computer system. In this regard, the system 130 includes, for example, one or more processors 132 that may be configured to execute instructions, such as software instructions, provided in one or more memories 134 and/or stored in non-transitory form in one or more non-transitory machine readable media 136 (e.g., which may be internal or external to the system 130). For example, in some embodiments, the system 130 may run PLD configuration software, such as Lattice Diamond System Planner software available from Lattice Semiconductor Corporation to permit a user to create a desired configuration and generate corresponding configuration data to program the PLD 100.

In some embodiments, the memory 106 of the PLD 100 may include non-volatile memory (e.g., flash memory) utilized to store the configuration data generated and provided to the memory 106 by the external system 130. During configuration of the PLD 100, the non-volatile memory may provide the configuration data via configuration paths and associated data lines to configure the various portions (e.g., I/O blocks 102, PLBs 104, SERDES blocks 150, routing resources 180, and/or other portions) of the PLD 100. In some cases, the configuration data may be stored in non-volatile memory external to the PLD 100 (e.g., on an external hard drive such as the memories 134 in the system 130). During configuration, the configuration data may be provided (e.g., loaded) from the external non-volatile memory into the PLD 100 to configure the PLD 100.

The system 130 also includes, for example, a user interface 135 (e.g., a screen or display) to display information to a user, and one or more user input devices 137 (e.g., a keyboard, mouse, trackball, touchscreen, and/or other device) to receive user commands or design entry to prepare a desired configuration of the PLD 100.

Figure 2:
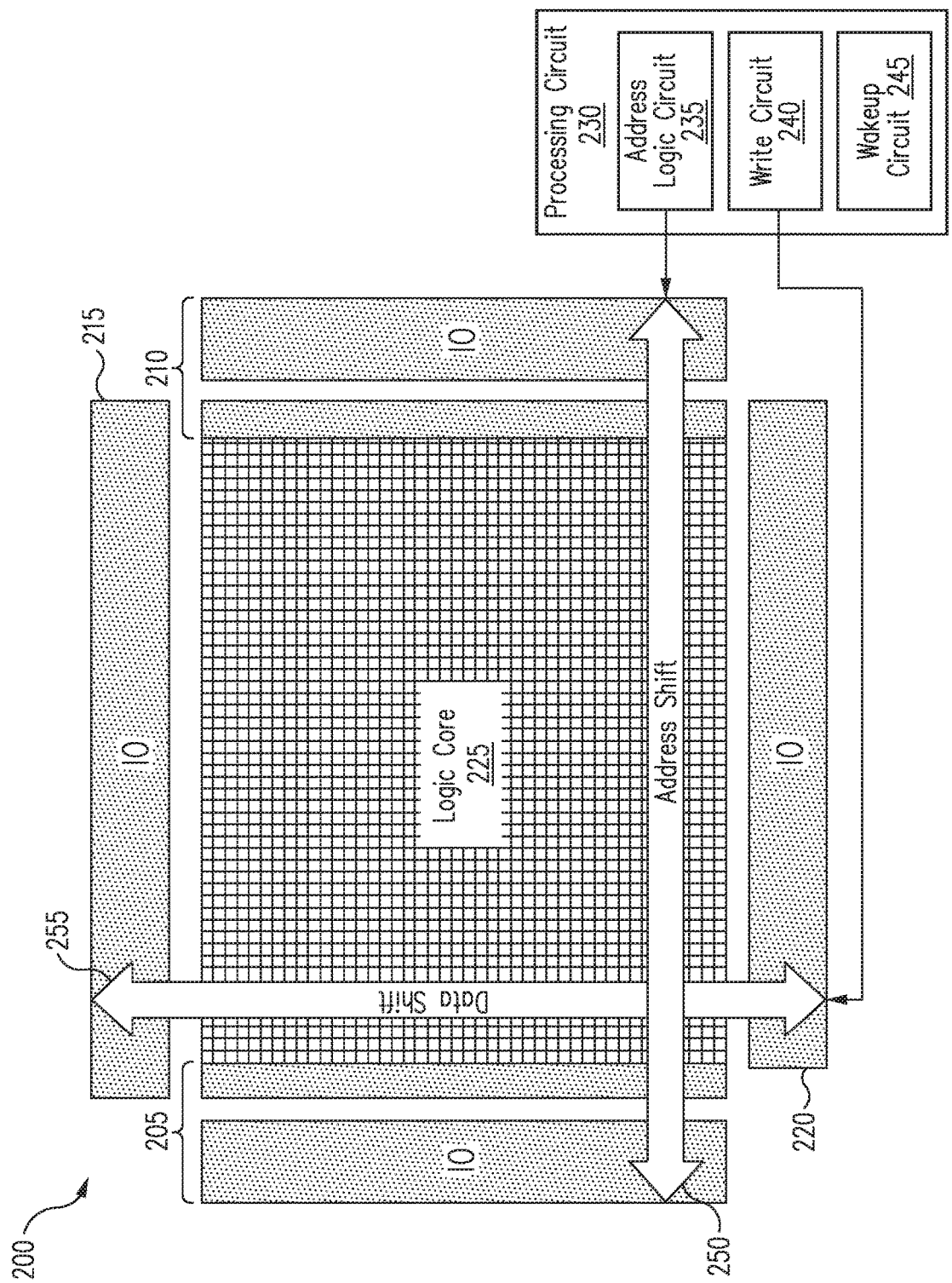
FIG. 2 illustrates a block diagram of a PLD with input/output fabric and logic fabric and an associated processing circuit in accordance with an embodiment of the disclosure.

FIG. 2 illustrates a block diagram of a PLD 200 with I/O fabric and logic fabric and an associated processing circuit 230 in accordance with an embodiment of the disclosure. The I/O fabric of the PLD 200 may be provided by I/O portions 205, 210, 215, and 220. The logic fabric of the PLD 200 may be provided by a logic core 225 (e.g., also referred to as an IC core). The I/O portions 205, 210, 215, and/or 220 may include logic, resources (e.g., routing resources), configuration memory usable for storing configuration data, and/or generally any components, that are associated with facilitating providing of the I/O fabric's functionality. Similarly, the logic core 225 may include logic, resources (e.g., routing resources), configuration memory usable for storing configuration data, and/or generally any components, that are associated with facilitating providing of the logic fabric's functionality.

In an embodiment, the PLD 200 may be, may include, or may be a part of the PLD 100. In an aspect, the I/O fabric of the PLD 200 may include the I/O blocks 102, SERDES blocks 150, PCS blocks 152, and associated circuitry (e.g., routing resources 180, clock-related circuitry 108, and/or connections thereto, etc.). In an aspect, the logic fabric may include the PLBs 104, hard IP blocks 160, and associated circuitry.

The configuration memory of the PLD 200 may include an array of configuration memory cells usable to store configuration data (e.g., each configuration memory cell may store one bit). The array of configuration memory cells may be arranged in rows and columns. In an aspect, the I/O portions 205, 210, 215, and/or 220 and the logic core 225 may include configuration memory cells (e.g., arranged in rows and columns) and form a portion of the array. The configuration memory cells may be volatile memory cells (e.g., RAM cells, such as SRAM cells). In some cases, the configuration memory cells may be referred to as configuration RAM (CRAM) cells. Although the present disclosure generally refers to various operations performed on rows and/or columns, rows may be used as columns and columns may be used as rows as appropriate. In an aspect, configuration memory cells associated with I/O and logic may be referred to as I/O block configuration memory cells and logic block configuration memory cells.

To configure (e.g., program) the PLD 200 (e.g., the I/O fabric and the logic fabric), the configuration data can be provided as a configuration bitstream that is loaded serially or in parallel into the configuration memory cells. In some cases, shifting may be performed serially, such as using JTAG or SPIx1 mode. Alternatively or in addition, in some cases, shifting may be in parallel, then followed by internally shifting parallel/serial, such as using SPIx4 mode or parallel x8 mode for example. The processing circuit 230 of the PLD 200 may include an address logic circuit 235 to assert an address (e.g., column address) of the PLD 200 and a data write circuit 240 to load corresponding configuration data into one or more configuration memory cells associated with the asserted address. For example, the address logic circuit 235 may be utilized to selectively assert columns of the array using respective address lines (not shown) to allow configuration data to be loaded into the configuration memory cells using the data write circuit 240.

In FIG. 2, the address logic circuit 235 may be, or may be utilized to control (e.g., using control signals), an address shifter to effectuate a column-by-column address shift (e.g., represented by address shift 250) across columns of the PLD 200. The data write circuit 240 may be, or may be utilized to control (e.g., using control signals), a data shifter to receive a portion of the configuration data corresponding to an asserted column and load the portion of the configuration data into corresponding configuration memory cells (e.g., represented by data shift 255) of the PLD 200. In this regard, the configuration data may be loaded into the PLD 200 one column at a time by pushing data to be written into a data shifter controlled by the data write circuit 240, asserting a column address using the address logic circuit 235 to allow data to be written into configuration memory cells associated with the asserted column address, and loading the data into these configuration memory cells. Such pushing of configuration data, asserting of column address, and loading of configuration data may be performed for each subsequent column of the PLD 200 until the columns of the configuration memory have been loaded with their corresponding configuration data.

In some cases, the configuration data may include configuration memory frames, with the configuration data being written frame-by-frame into the configuration memory. For example, each configuration memory frame may include configuration data for one column of the PLD 200, with each configuration memory frame being shifted into a corresponding column of the configuration memory.

The processing circuit 230 of the PLD 200 may include a wakeup circuit 245 to wake up (e.g., activate) functionality of the I/O fabric and logic fabric after the configuration data have been loaded into the configuration memory cells associated with (e.g., utilized to implement) the I/O fabric and logic fabric. In an aspect, wakeup may refer to transitioning the PLD 200 from a configuration mode, in which configuration data is being loaded into the PLD 200, to a functional mode (e.g., also referred to as operational mode), in which the PLD 200 provides I/O and logic functionality. In this regard, after wakeup of the PLD 200 is complete, the PLD 200 is configured to operate using its I/O and logic fabric to provide I/O and logic functionality in accordance with user-specified applications. Such I/O and logic functionality may be effectuated through use of associated logic, resources (e.g., routing resources), stored configuration data, and/or other associated components. In some cases, a portion of the I/O fabric may provide static state control whereas another portion of the I/O fabric may be driven by (e.g., controlled by) the logic fabric.

In an embodiment, the processing circuit 230 may be, may include, or may be part of configuration and activation logic circuitry to receive configuration data, configure configuration memory cells of the PLD 200, and activate functionality of the I/O fabric and/or logic fabric associated with the configuration memory cells. In some cases, at least a portion of such circuitry is hardcoded in the PLD 200. For example, the address logic circuit 235, data write circuit 240, and wakeup circuit 245 may be hardcoded in the PLD 200.

In one or more embodiments, configuration data can be loaded into a portion of a PLD and wakeup of these configured portions of the PLD may be performed to facilitate fast boot of some functionality of the PLD. In this regard, configured portions (e.g., also referred to as programmed portions) of the PLD may refer to portions of the array of configuration memory cells of the PLD into which a corresponding portion of configuration data has been loaded. Fast boot may allow designated functionality to be provided by configured portions of the PLD while other portions of the PLD are still being configured (e.g., configuration data is being loaded into these non-configured portions). In some aspects, the functionality designated for fast boot may include designated I/O functionality and, in some cases, designated core logic functionality to be provided by the PLD faster than in a case that the PLD waits for an entirety of the PLD to be configured before waking up any portion of the PLD.

In some aspects, a manufacturer of the PLD may define portion(s) (e.g., physical locations) of the PLD designated for fast boot. The portions of the PLD designated for fast boot may correspond to a subset of the array of configuration memory cells of the PLD. As such, the configuration memory cells in the subset may be loaded with configuration data prior to configuration memory cells not part of the subset to allow early configuration and wakeup of functionality associated with the subset. In some cases, the manufacturer may indicate (e.g., on a datasheet) which portions of the PLD are designated for fast boot. A user (e.g., a designer) may generate a user design in accordance with these designations from the manufacturer to leverage fast boot capability. For example, for a given user-specified application, a user may identify I/O and/or logic functionality considered by the user to be the most time sensitive and/or critical functionality to cause generation of a layout with such functionality provided in the portions of the PLD designated for fast boot (e.g., to be configured and activated prior to other portions of the PLD).

In implementing fast boot, portions of the PLD, such as portions of the I/O fabric and, in some cases, the logic fabric, may be configured into a known state and activated faster than in a case that the entire PLD is configured prior to wakeup. In some cases, the portions of the PLD designated for fast boot may be configured into a known state once a few frames of the configuration bitstream is loaded into the PLD and an associated wakeup performed to activate associated functionality. For example, the portions of the I/O fabric that are activated due to the fast boot may drive to a proper polarity and with desired driver characteristics (e.g., I/O type, drive strength, pull up/down feature, etc.), such as to effectuate control of a component (e.g., fan, LED) by the PLD.

Figure 3A:
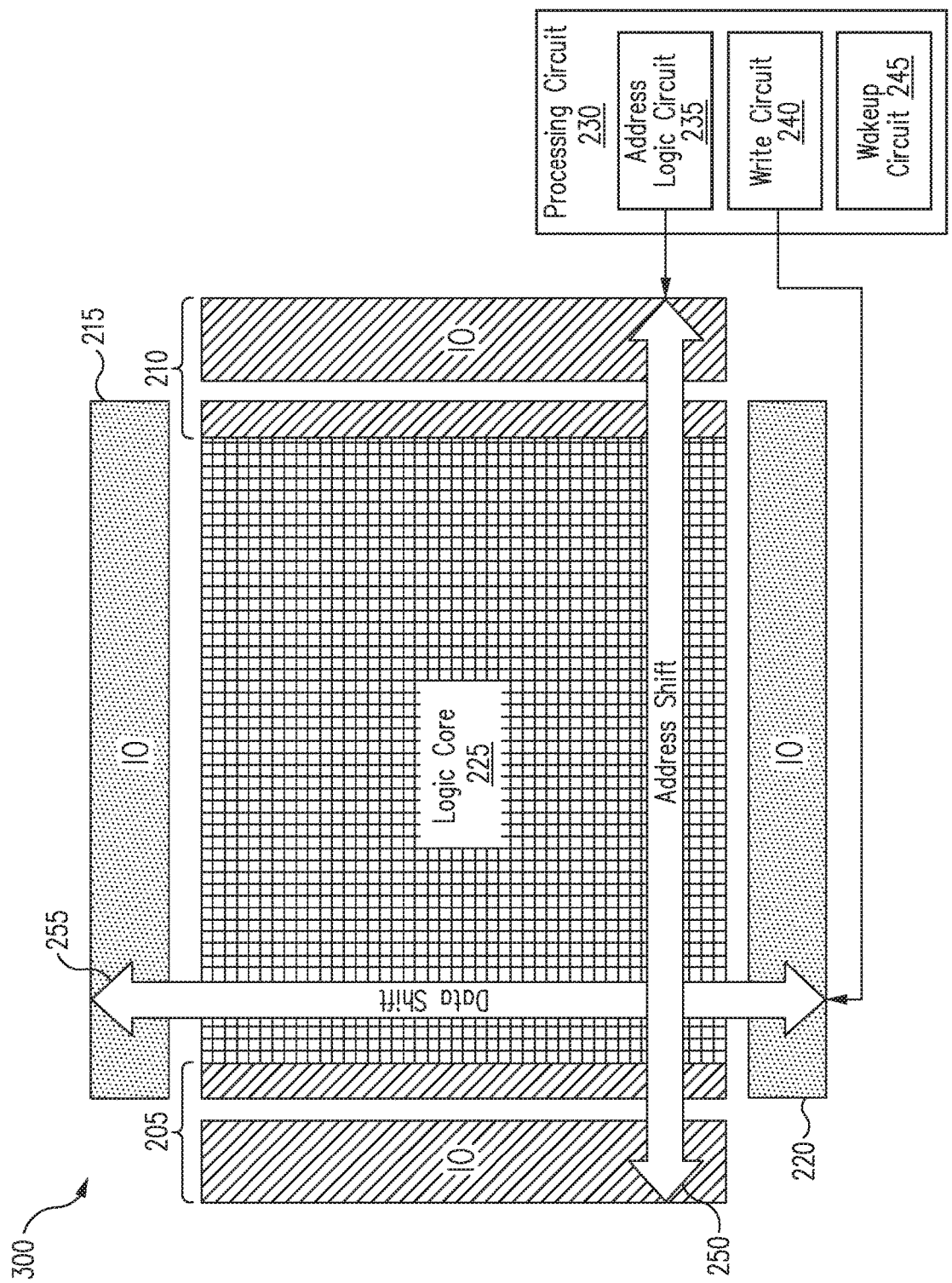
FIGS. 3A-3C illustrates block diagrams of a PLD with input/output portions designated for fast boot at various stages of configuration and wakeup in accordance with an embodiment of the present disclosure.
Figure 3B:
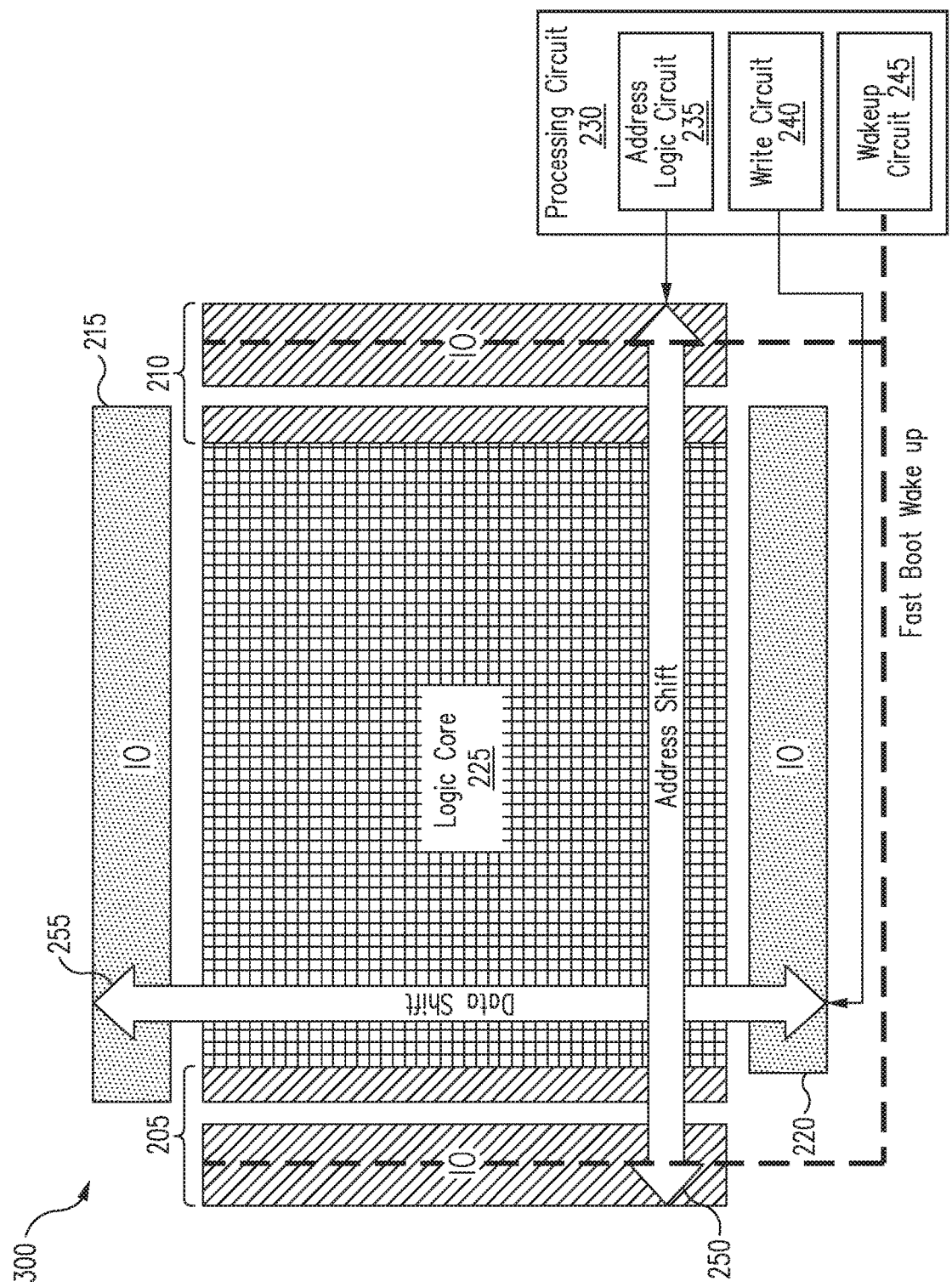
Figure 3C:
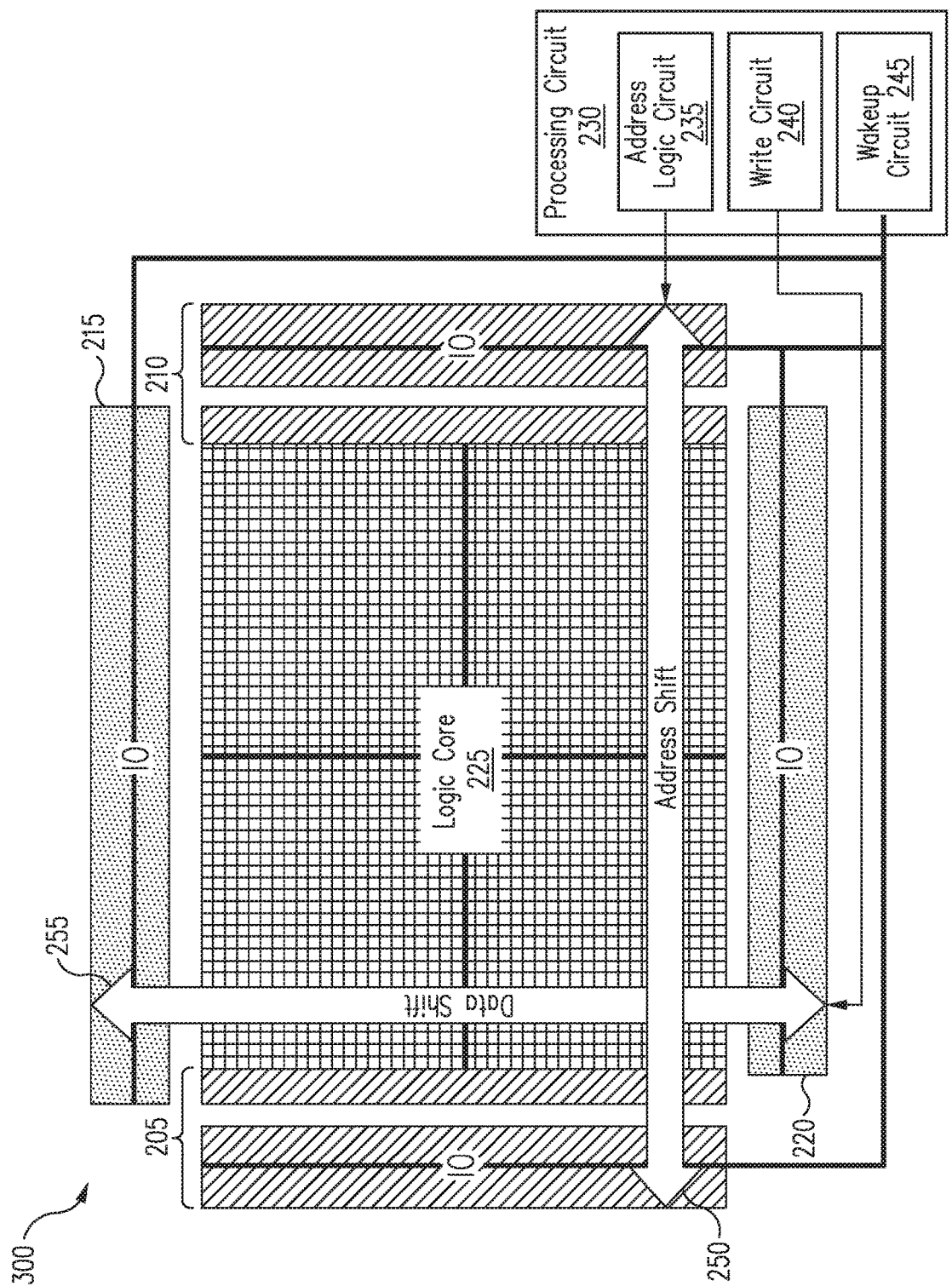

FIGS. 3A-3C illustrates block diagrams of a PLD 300 with I/O portions 205 and 210 designated for fast boot at various stages of configuration and wakeup in accordance with an embodiment of the present disclosure. The PLD 300 also includes I/O portions 215 and 220 and logic core 225 that are not designated for fast boot. In an embodiment, the PLD 300 may be the same as the PLD 200 except with the I/O portions 205 and 210 designated for fast boot. In some cases, the I/O portions 205 and 210 may be designated for fast boot by a manufacturer of the PLD 200. To leverage the fast boot capability, the user may associate I/O functionality with the I/O portions 205 and/or 210 based on criteria (e.g., time sensitivity and/or importance of functionality) and associate other I/O functionality (e.g., less time-sensitive and/or less critical) with the I/O portions 215 and/or 220.

The processing circuit 230 effectuates the fast boot by providing (e.g., using the address logic circuit 235 and data write circuit 240) configuration data to configuration memory cells of the I/O portions 205 and 210 and, upon configuring the I/O portions 205 and 210, activating, using the wakeup circuit 245, the portion of the I/O fabric associated with the I/O portions 205 and 210. Upon waking up the portion of the I/O fabric, the portion of the I/O fabric may provide its associated I/O functionality. After functionality associated with the I/O portions 205 and 210 are activated, the processing circuit 230 may configure and activate the other portions 215, 220, and 225 of the PLD 200.

As an example, to configure the PLD 300, the addresses associated with the I/O portion 205 may be asserted one at a time (e.g., starting with a leftmost column) and a configuration memory frame loaded into the asserted column until all columns of the I/O portion 205 are configured. In some cases, column addresses may be asserted such that contiguous columns are asserted from one iteration to the next iteration. The addresses associated with the I/O portion 210 may be asserted one at a time and a configuration memory frame loaded into the asserted column until all columns of the I/O portion 210 are configured. In some cases, configuration time associated with configuration of the I/O portions 205 and 210 may be facilitated (e.g., made more time efficient) through writing of the configuration bitstream frame-by-frame. For example, a first set of frames of the configuration bitstream (e.g., frames earlier in the bitstream) may be loaded into the I/O portion 205 and a last set of frames of the bitstream (e.g., frames toward an end of the bitstream) may be loaded into the I/O portion 210.

As shown in FIG. 3B, once the I/O portions 205 and 210 are configured, the wakeup circuit 245 may generate and provide a wakeup signal to wake up the portions of the I/O fabric associated with the I/O portions 205 and 210 such that the portions of the I/O fabric may provide their functionality. In waking up the portions of the I/O fabric, the portions of the I/O fabric transition from a configuration mode to a fast boot operation mode such that the portions of the I/O fabric perform I/O functionality (e.g., as defined by the user). In this regard, such I/O functionality may be referred to as fast boot static state control. Configuration data associated with such I/O functionality are stored in the configuration memory cells of the I/O portions 205 and 210.

As an example, the I/O functionality may include causing an LED controlled by the I/O fabric of the PLD 300 to turn on. In this example, by designating such I/O functionality for fast boot, the I/O functionality for controlling the LED by the PLD 300 may be defined earlier than in a case that the I/O functionality is provided after the entire PLD 300 is configured, thus reducing any flickering or misbehavior of the LED prior to the I/O functionality being placed in a defined state to control the LED.

To configure a remaining portion of the PLD 300, the processing circuit 230 may use the address logic circuit 235 and data write circuit 240 to load configuration data into configuration memory cells of the I/O portions 215 and 220 and logic core 225. In some cases, the I/O functionality associated with the I/O portions 205 and 210 may be in the process of being wakened up while configuration data is starting to be loaded into the remaining configuration memory of the remaining portions 215, 220, and 225 of the PLD 300. In other cases, the I/O functionality is finished waking up prior to configuration data starting to be loaded into the remaining configuration memory of the PLD 300.

In some embodiments, the I/O portions 215 and 220 and logic core 225 may be configured in any order and/or using any orientation (e.g., row-by-row, column-by-column, or any other manner). As an example, in configuring the logic core 225, the address logic circuit 235 and data write circuit 240 may be configured as appropriate to assert rows or columns and load in associated configuration data based on the number of rows or columns of configuration memory cells in the logic core 225. In some cases, in FIG. 3B, shifting column-by-column may be more efficient (e.g., faster, uses fewer address shifting, etc.) due to sharing the address and data shift units (e.g., 250, 255) utilized when configuring the I/O portions 205 and 210 designated for fast boot.

In some cases, configuration of the I/O portions 215 and 220 may be segmented. For example, in FIG. 3B, some columns of the I/O portion 205 overlap with columns of the I/O portions 215 and 220, and similarly some columns of the I/O portion 210 overlap with columns of the I/O portions 215 and 220. The processing circuit 230 may use the address logic circuit 235 and data write circuit 240 to load the configuration data column-by-column into the I/O portions 215 and 220. In one example, the address shift 250 and data shift 255 may be used such that a column of the I/O portions 215 and 220 is asserted and associated configuration data loaded into configuration memory cells of the I/O portions 215 and 220 (e.g., and not the configuration memory cells of the I/O portions 205 and 210) for the asserted column. In another example, the address shift 250 and data shift 255 may be used to assert each column of the I/O portion 215 and load associated configuration data into the I/O portion 215, and then the address shift 250 and data shift 255 may be used to assert each column of the I/O portion 220 and load associated configuration data into the I/O portion 215. In other cases, the address logic circuit 235 and data write circuit 240 may rotate their orientation such that the address logic circuit 235 asserts the I/O portions 215 and 220 row-by-row and the data write circuit 240 loads configuration data for the asserted row.

Other manners by which to configure the remaining portions 215, 220, and 225 may be utilized and may be selected based on criteria, such as speed considerations, complexity (e.g., number of operations), etc. Different portions of the PLD 300 may be configured using data and address shifts in different orientations (e.g., rotations) and/or with segmented data shift.

As shown in FIG. 3C, after the configuration data is loaded into the configuration memory cells of the remaining portions 215, 220, and 225 of the PLD 300, the wakeup circuit 245 generates and provides a wakeup signal for the PLD 300 that allows wake up of I/O and logic functionality of the PLD 300. In this regard, the portion of the I/O fabric associated with fast boot may transition from the fast boot operation mode to a system operation mode associated with the PLD 300. The logic fabric and the remaining portion of the I/O fabric may transition from the configuration mode to the full system operation mode of the PLD 300. In some cases, the portion of the I/O fabric associated with fast boot may have different functionality at the time of fast boot relative to the time at which the entire PLD 300 is configured. For example, a portion of the I/O fabric may provide static state control in the fast boot operation mode and then transition to logic-controlled I/O in the full system operation mode. In this regard, such portion of the I/O fabric may provide I/O functionality based on signals provided to the I/O fabric from the logic fabric.

Although examples are given above with regard to loading configuration data into the I/O portions 205 and 210 for fast boot configuration and activation and the remaining portions 215, 220, and 225 for normal configuration and activation, the configuration data may be loaded into the I/O portions 205 and 210 in any manner such that the I/O portions 205 and 210 are configured and subsequently the configuration data may be loaded into the remaining portions 215, 220, and 225 in any manner such that the remaining portions 215, 220, and 225 are configured. For example, the configuration data need not be loaded one column or row at a time into these portions 205, 210, 215, 220, and 225. In addition, although FIGS. 3A-3C show the address shift 250 and the data shift 255, multiple address shifts and multiple data shifts may be operated (e.g., serially or in parallel, synchronously or independently) to configure the I/O portions 205 and 210 for fast boot and/or the remaining portions 215, 220, and 225 afterwards.

Figure 4:
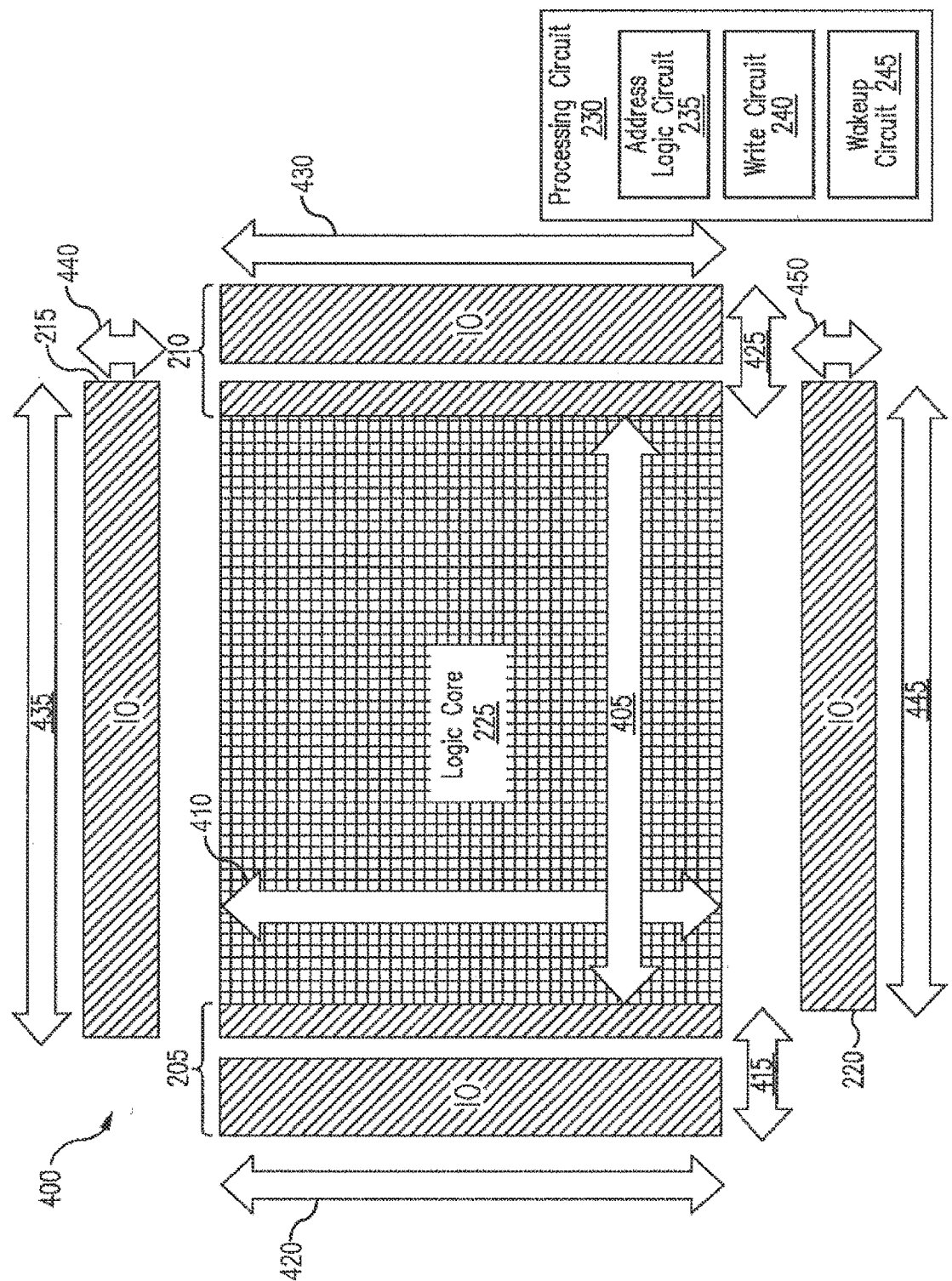
FIG. 4 illustrates a block diagram of a PLD with input/output portions designated for fast boot in accordance with an embodiment of the present disclosure.

FIG. 4 illustrates a block diagram of a PLD 400 with the I/O portions 205, 210, 215, and 220 designated for fast boot in accordance with an embodiment of the present disclosure. The description of FIGS. 3A-3C generally applies to FIG. 4, with examples of differences and other description provided herein. In an embodiment, the PLD 400 may generally be the same as the PLD 200 except with the I/O portions 205, 210, 215, and 220 designated for fast boot.

To configure the PLD 400 for fast boot operation, various address shifts and data shifts (represented by 415, 420, 425, 430, 435, 440, 445, and 450) may be utilized to configure the I/O portions 205, 210, 215, and 220. Upon configuring the I/O portions 205, 210, 215, and 220, the I/O fabric of the PLD 200 may be activated to provide I/O functionality of the PLD 400, thus transitioning the I/O fabric of the PLD 400 from a configuration mode to a fast boot operation mode. In conjunction with or after activating the I/O functionality, an address shift and a data shift (represented by 405 and 410) may be utilized to configure the logic core 225. The logic functionality associated with the logic fabric of the PLD 400 may be activated to transition from the configuration mode to a full system operation mode of the PLD 400. The I/O functionality may transition from the fast boot operation mode to the full system operation mode.

The various address shifts and data shifts may be, or may be controlled by, the address logic circuit 235 and data write circuit 240. Control signals from the address logic circuit 235 and data write circuit 240 are not shown in FIG. 4 for purposes of clarity. In FIG. 4, the various address shifts and data shifts are perpendicular to each other. Different combinations of orientations may be utilized for the address shifts and data shifts. As one example, the shift 415 may be an address shift (e.g., column address shift) and shift 420 may be a data shift (e.g., shifting in data one column at a time). As another example, the shift 420 may be an address shift (e.g., row address shift) and shift 415 may be a data shift (e.g., shifting in data one row at a time).

In some cases, one or multiple address shifters and data shifters may be utilized for configuring the I/O portions 205, 210, 215, and 220 and logic core 225. As an example, when the I/O portions 215 and 220 are configured column-by-column, the shifts 435 and 445 may be implemented by a single column address shift and the shifts 440 and 450 may be a single data shifter for loading in configuration data of an asserted column. As another example, when the I/O portions 215 and 220 are configured column-by-column, the shifts 435 and 445 may be implemented by two (or more) column address shifters and the shifts 440 and 450 may be a two (or more) data shifters for loading in configuration data of two (or more) simultaneously asserted columns. In this latter example, the shifts 435 and 445 may operate independently of each other (e.g., the shifts 435 and 445 may be asserting different columns). Fewer, more, and/or different shifts other than those shown in FIG. 4 may be utilized.

Figure 5:
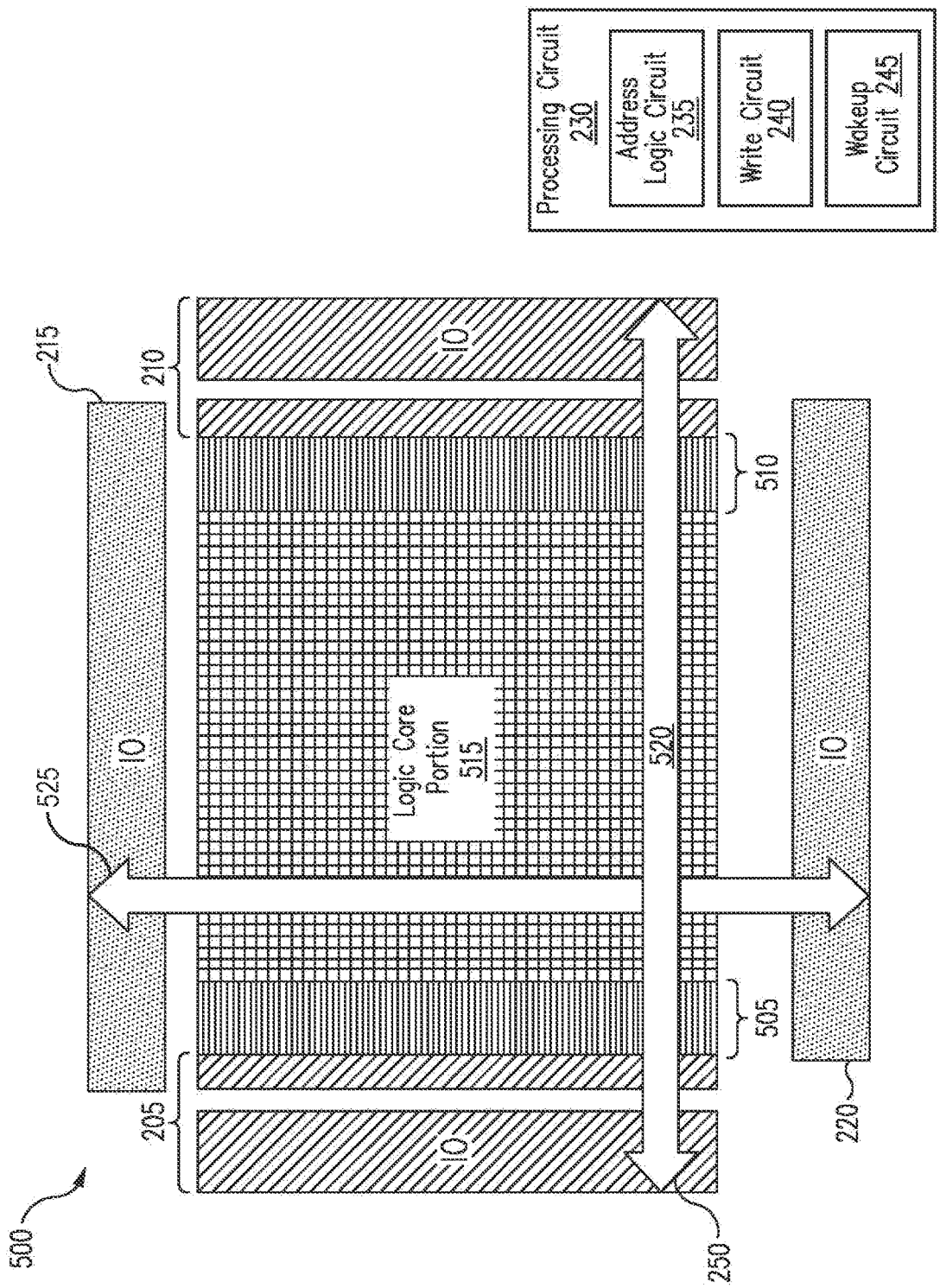
FIGS. 5 and 6 illustrate block diagrams of PLDs with input/output and logic core portions designated for fast boot in accordance with an embodiment of the present disclosure.

FIG. 5 illustrates a block diagram of a PLD 500 with the I/O portions 205 and 210 and logic core portions 505 and 510 designated for fast boot in accordance with an embodiment of the present disclosure. The description of FIGS. 3A-3C generally applies to FIG. 5, with examples of differences and other description provided herein. In an embodiment, the PLD 500 may generally be the same as the PLD 200 except with the I/O portions 205 and 210 and logic core portions 505 and 510 designated for fast boot.

The logic core 225 may include logic core portions 505, 510, and 515. To configure the PLD 500 for fast boot, an address shift (e.g., 520) and a data shift (e.g., 525) may be utilized to configure the I/O portions 205 and 210 and logic core portions 505 and 510. In one example, the address shift may begin configuration by asserting a left-most column of the I/O portion 205 and moving rightwards to a right-most column of the logic core portion 505, and then begin configuration of the I/O portion 210 and logic core portion 510.

Upon configuring the portions 205, 210, 505, and 510, the associated portion of the I/O fabric and logic fabric of the PLD 500 may be activated to provide associated I/O and logic functionality of the PLD 500, thus transitioning the portion of the I/O fabric and logic fabric from a configuration mode to a fast boot operation mode. In this case, the portion of the I/O fabric may provide static state control and/or logic controlled I/O. In conjunction with or after waking up the portion of the I/O and logic functionality, one or more address shifts and/or data shifts may be utilized to load configuration data into configuration memory cells of the logic core portion 515 and I/O portions 215 and 220 to configure the portions 215, 220, and 515. The I/O and logic functionality of the PLD 500 may be activated to transition to the full system operation mode of the PLD 500. Other manners (e.g., orders, orientations) by which to configure the I/O portions 205, 210, 215, and 220 and logic core portions 505, 510, and 515 may be utilized.

Figure 6:
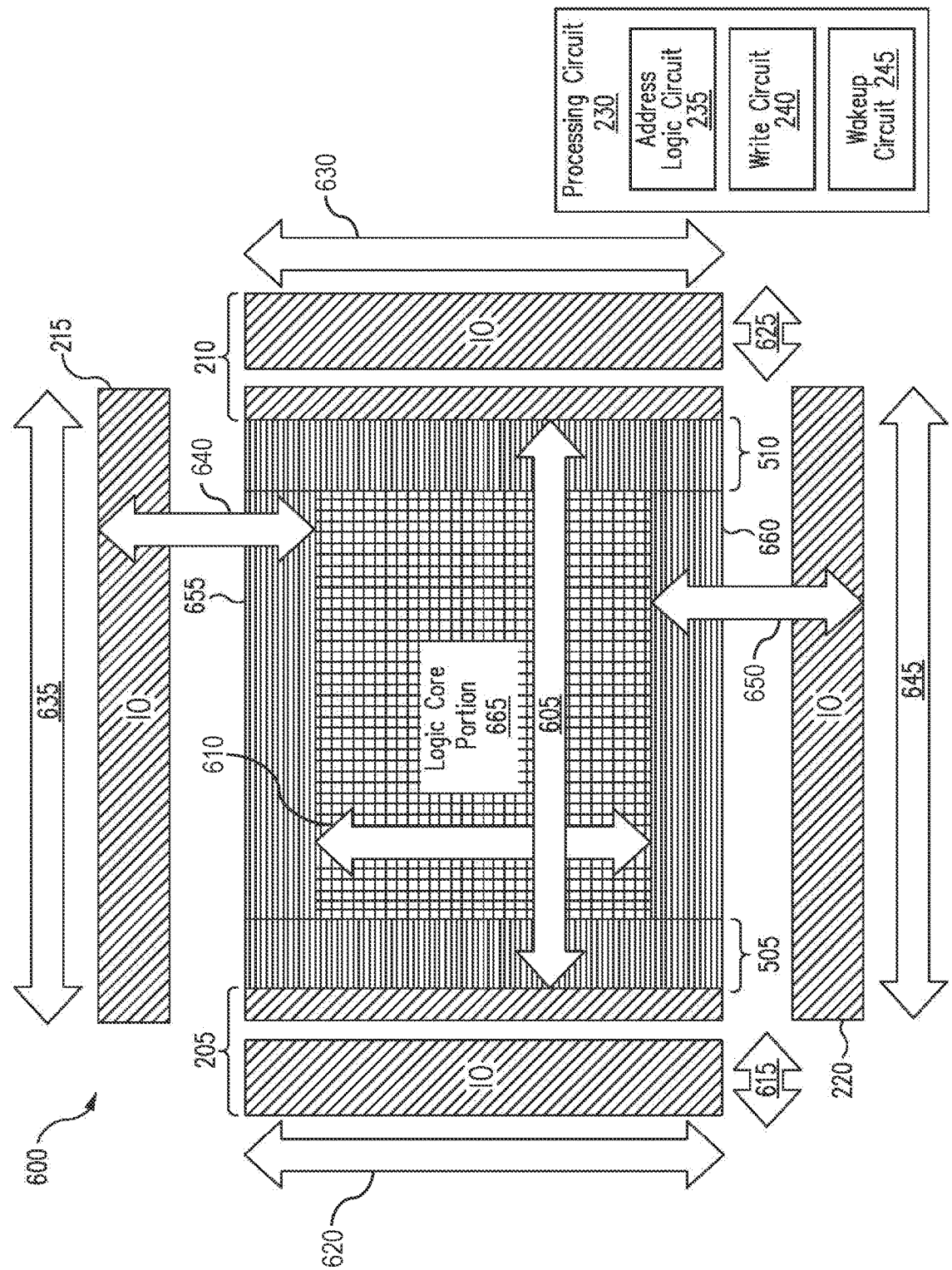

FIG. 6 illustrates a block diagram of a PLD 600 with the I/O portions 205, 210, 215, and 220 and logic core portions 505, 510, 655, and 660 designated for fast boot in accordance with an embodiment of the present disclosure. The description of FIGS. 3A-3C generally applies to FIG. 6, with examples of differences and other description provided herein. In an embodiment, the PLD 600 may generally be the same as the PLD 200 except with the I/O portions 205, 210, 215, and 220, and logic core portions 505, 510, 655, and 660 designated for fast boot.

To configure the PLD 600 for fast boot operation, various address shifts and data shifts (represented by 615, 620, 625, 630, 635, 640, 645, and 650) may be utilized to configure the I/O portions 205, 210, 215, and 220 and the logic portions 655 and 660. In conjunction with or after waking up the portion of the I/O and logic functionality associated with the portions 205, 210, 215, 220, 655, and 660, shifts 605 and 610 may be utilized to configure a logic core portion 665. The I/O and logic functionality of the PLD 600 may then be activated to transition to the full system operation mode of the PLD 600.

Although FIGS. 3A-3C and 4-6 show examples of a PLD with I/O portions and/or logic portions being designated for fast boot, in some cases different I/O and logic portions may be defined in the PLD. For example, the I/O portion 205 may include a first portion designated for fast boot and a second portion not designated for fast boot. As indicated previously, more, fewer, and/or different address shifts and/or data shifts may be utilized to configure the PLD. In addition, although the foregoing describes the configuration memory cells of the I/O portions and/or logic core portions in terms of rows and columns with configuration memory cells designated for fast boot being provided by contiguous rows/columns, in some cases the configuration memory cells designated for fast boot may be distributed in other manners and need not be in contiguous columns/rows.

Figure 7:
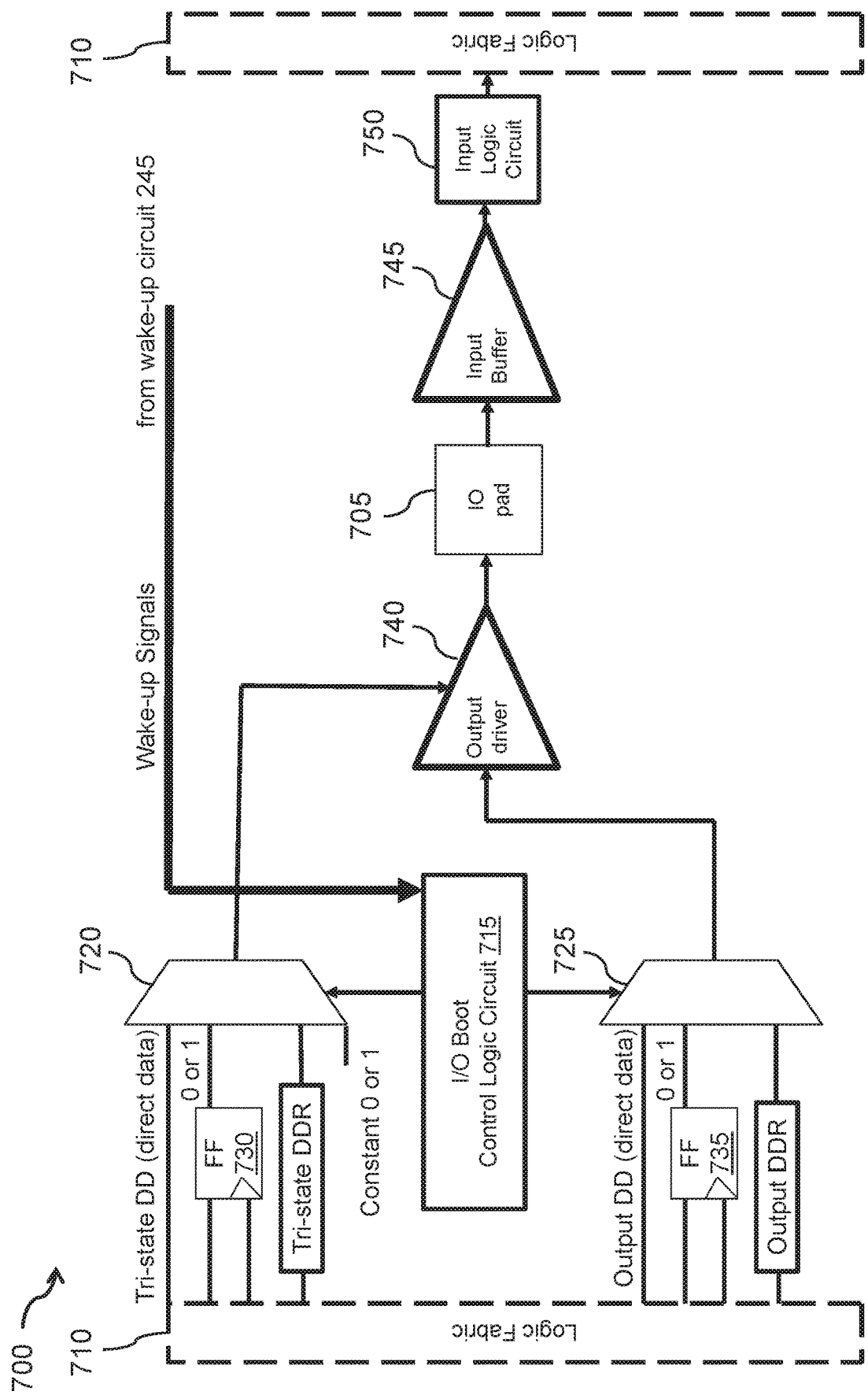
FIG. 7 illustrates a block diagram of an input/output control circuit for activating and providing input/output functionality in accordance with an embodiment of the disclosure.

FIG. 7 illustrates a block diagram of an I/O control circuit 700 for activating and providing I/O functionality in accordance with an embodiment of the disclosure. The I/O control circuit 700 of FIG. 7 is primarily described with reference to the PLD 300 of FIGS. 3A-3C in which the I/O portions 205 and 210 are designated for fast boot, although the I/O control circuit 700 may also be utilized with other designations of I/O and/or control functionality such as those in FIGS. 4-6. For discussion purposes, the I/O control circuit 700 is associated with a portion of an I/O fabric of the PLD 300 designated for fast boot.

The I/O control circuit 700 includes an I/O pad 705 coupled to a logic fabric 710 via an output path or an input path. In an aspect, the logic fabric 710 may be provided by the logic core 225. In some cases, a portion of the I/O control circuit 700 may be hardcoded in to the PLD 200, such as logic of an I/O boot control logic circuit 715, output driver 740, and/or input logic circuit 750.

With reference to the PLD 300, once the I/O portions 205 and 210 are configured (e.g., loaded with configuration data), the I/O boot control logic circuit 715 may receive a wakeup signal (e.g., from the wakeup circuit 245) and generate control signals in response to the wakeup signal to wake up of the I/O functionality associated with the I/O portions 205 and 210. The control signals may be utilized as selector signals to control operation of multiplexers 720 and 725. In this regard, the multiplexer 720 is coupled to four input lines: tri-state direct data (DD) line, flip-flop line, tri-state double data rate (DDR) line, and constant value line. The multiplexer 725 is coupled to three input lines: output DD line, output flip-flop line, and output DDR line. In some cases, the DD line and DDR line for the multiplexers 720 and 725 allow logic-driven I/O functionality. In FIG. 7, the control signals of the I/O boot control logic circuit 715 may be selector signals to select one of the four input lines of the multiplexer 720 and one of the three input lines of the multiplexer 725.

In some aspects, to facilitate fast boot operation, the I/O boot control logic circuit 715 may generate control signals to cause selection of the flip-flop lines of the multiplexers 720 and 725 or the constant value line of the multiplexer 720. Values (e.g., 0 or 1) stored in flip-flops 730 and 735 are provided on the flip-flop lines. In some cases, the flip-flops 730 and/or 735 may store a bit (e.g., 0 or 1 value) of the configuration bitstream. In other cases, the flip-flops 730 and/or 735 may store a bit (e.g., 0 or 1) that is hardcoded into memory of the PLD 300. In an aspect, when a portion of the logic fabric designated for fast boot operation (e.g., PLD 500 and 600) is configured, the I/O boot control logic circuit 715 may generate control signals to cause selection of the flip-flop lines, constant value line (e.g., for the multiplexer 720), DDR line, or DD line, such as based on logic provided by the portion of the logic fabric to allow logic-driven I/O functionality.

An output of the multiplexer 720 (e.g., the value stored in the flip-flop 730) may enable an output driver 740 to drive a value onto the I/O pad 705 or disable (e.g., put in tri-state) the output driver 740. When the output driver 740 is enabled for driving, the output driver 740 drives a value provided by an output of the multiplexer 725 (e.g., the value stored in the flip-flop 735) to the output driver 740 onto the I/O pad 705. For example, when the flip-flop 730 stores a 1, the output driver 740 may be enabled and the value (e.g., 0 or 1) stored in the flip-flop 735 is provided to the output driver 740 and driven (e.g., to logic low or logic high) onto the I/O pad 705 by the output driver 740. When the flip-flop 730 stores a 0, the output driver 740 may be disabled and any value received by the output driver 740 from the flip-flop 735 is not driven onto the I/O pad 705 by the output driver 740. In an aspect, when the output driver 740 is disabled, the output driver 740 may be referred to as being in tri-state or high-impedance mode.

As an example, the I/O pad 705 may be coupled to a component (e.g., a fan, an LED) controlled by the I/O fabric of the PLD 300. When a value of 0 (e.g., converted to a logic low) is driven onto the I/O pad 705, the component may be off (e.g., turned off if the component is turned on or remain off if the component is already off). When a value of 1 (e.g., converted to a logic high) is driven onto the I/O pad 705, the component may be on (e.g., turned on if the component is turned off or remain on if the component is already on).

On the input side, the I/O pad 705 may receive signals from an external component connected to the PLD 300. An input buffer 745 may receive the signals from the external component via the I/O pad 705 and provide the signals to the input logic circuit 750. The input logic circuit 750 may process the received signals and provide the processed signals to the logic fabric 710 to perform associated logic. In some cases, such as when logic functionality is not designated for fast boot, the input path is generally not used during fast boot operation since logic functionality provided by the PLD 300 has not been activated. In other cases, such as when a portion of the logic functionality is designated for fast boot, the input path may be utilized to receive signals from an external component and provide to the logic fabric 710 for processing.

Once the entirely of the PLD 300 is configured, the wakeup circuit 245 may provide a wakeup signal to transition the I/O and logic fabric to the full system operation mode. In transitioning from the fast boot operation mode to the full system operation mode, the I/O boot control logic circuit 715 may generate control signals to cause the multiplexers 720 and/or 725 to select from one of their respective input lines in accordance with a user-specified application, as shown in Table 1. In this regard, the I/O boot control logic circuit 715 may, but need not, select the flip-flop input lines.

TABLE 1

| Fast boot | Normal | Notes |
| --- | --- | --- |
| FF | FF | Preferred |
| FF | DD | Reset to same value as that |
| FF | DDR | provided by FF |

In one case, the I/O functionality effectuated through use of the I/O pad 705 and other components of the I/O logic control circuit 700 may remain unchanged between the fast boot operation mode and the full system operation mode. In this case, for example, the I/O boot control logic circuit 715 may generate control signals to cause the multiplexers 720 and 725 to select the flip-flops lines during the fast boot operation mode and the full system operation mode. Such I/O functionality may provide static state control in both the fast boot and full system operation modes.

In another case, the I/O functionality effectuated through use of the I/O pad 705 may differ between the fast boot operation mode and the full system operation mode. In this case, the I/O boot control logic circuit 715 may generate control signals to cause the multiplexers 720 and/or 725 to transition from selecting the flip-flop line to one of the other input lines, such as one of the DD, flip-flop, DDR, or constant value line. In an embodiment, to facilitate transition (e.g., seamless transition, glitchless transition) from the fast boot operation mode to the full system operation mode, DD or DDR values provided by the logic fabric 710 on the corresponding input lines of the multiplexers 720 and/or 725 may be reset to the same values as those stored in the flip-flops 730 and 735. After reset, the logic fabric 710 may provide onto the DD or DDR lines values according to a user-specified application, where such values on the DD or DDR lines may be different from the values stored in the flip-flops 730 and 735. For example, such logic-controlled I/O may be effectuated after a predetermined (e.g., threshold) amount of time after transitioning into the full system operation mode has elapsed to facilitate the transition.

Although FIG. 7 is described with respect to I/O designated for fast boot, in some cases the I/O control circuit 700 may be utilized with I/O not designated for fast boot. In such cases, the I/O boot control logic circuit 715 does not receive or does not respond to a wakeup signal associated with fast boot. The I/O boot control logic circuit 715 may generate control signals to control the multiplexers 720 and 725 (and thus control the output and input sides) in response to a wakeup signal received after the entire PLD has been configured.

Figure 8:
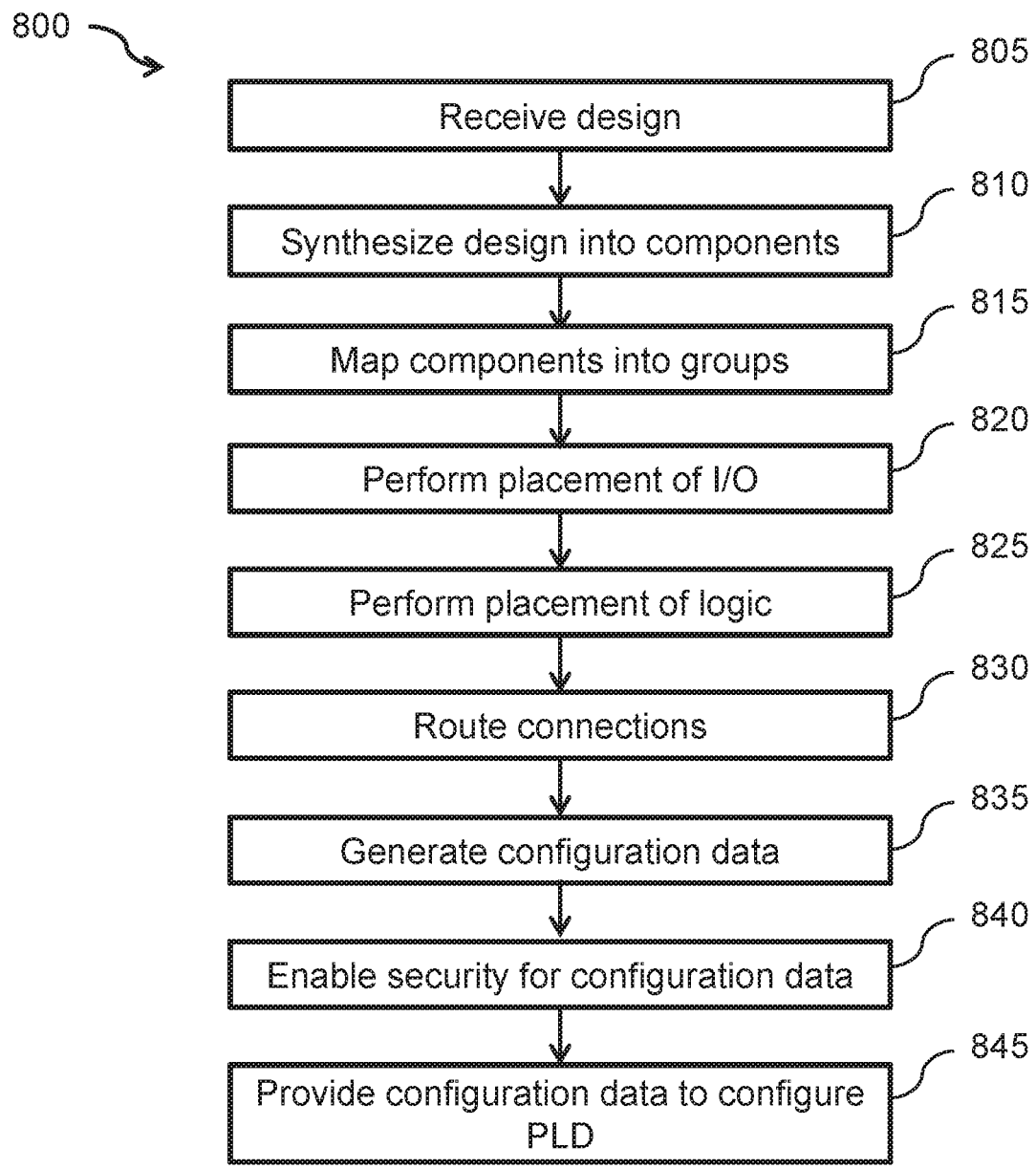
FIG. 8 illustrates a flow diagram of an example design process for a PLD in accordance with an embodiment of the disclosure.

FIG. 8 illustrates a flow diagram of an example design process 800 for a PLD in accordance with an embodiment of the disclosure. Note that one or more operations may be combined, omitted, and/or performed in a different order as desired. For example, the process of FIG. 8 may be performed by the external system 130 running Lattice Diamond software to configure the PLD.

At block 805, the external system 130 receives a design that specifies a desired functionality of a PLD (e.g., 300). For example, a user may interact with the external system 130 (e.g., through user input device 137 and hardware description language (HDL) code representing the design) to identify various features of the design (e.g., high level logic operations, hardware configurations, and/or other features. For example, the HDL representation may utilize register-transfer-level (RTL)-based design. In the user design, the user may set an attribute to designate for fast boot portions of the I/O fabric, portions of the logic fabric, and/or other components.

At block 810, the external system 130 synthesizes the design into a set of netlist components that may be used to implement the design. For example, the external system 130 may provide a netlist that identifies various types of components by the PLD and their associated signals. The external system 130 may perform one or more rule checks to confirm that the design describes a valid configuration of the PLD. For example, the external system 130 may reject invalid configurations and/or request the user to provide new design information as appropriate.

At block 815, the external system 130 performs a mapping process in which sets of the netlist components are grouped (e.g., packed) together. In some cases, the sets of the netlist components may include sets associated with I/O functionality and sets associated with logic functionality.

At block 820, the external system 130 performs a placement process to assign the grouped netlist components associated with I/O functionality to particular physical components residing at specific physical locations of the PLD. For example, with reference to FIG. 3A, the placement process may place grouped netlist components associated with fast boot I/O functionality in physical locations (e.g., banks) of the PLD 300 designated for fast boot of I/O functionality, such as the physical locations of the I/O portions 205 and 210. The placement process may place grouped netlist components not associated with fast boot I/O functionality in other physical locations, such as in the I/O portions 215 and 220.

At block 825, the external system 130 performs a placement process to assign the grouped netlist components associated with logic functionality to particular physical components residing at specific physical locations of the PLD (e.g., assigned to particular logic blocks and/or particular physical components within logic blocks). For example, the placement process may place grouped netlist components associated with fast boot logic functionality (if any) in physical locations (e.g., banks) of the PLD designated for fast boot of logic functionality.

Although the blocks 820 and 825 are provided as separate blocks in FIG. 8, the blocks 820 and 825 may be performed separately or together. For example, I/O placement may occur together with logic placement. In another example, the placement of any fast boot functionality (e.g., fast boot I/O and/or logic functionality) may be performed prior to placement of any remaining I/O and/or logic functionality.

At block 830, the external system 130 routes connections among the assigned physical components (e.g., using routing resources) to realize physical interconnections. By performing the blocks 820, 825, and 835, the external system 130 determines a layout (associated with the received design) that includes positions of PLD components to be configured and activated to provide functionality (e.g., I/O and logic functionality) and associated routing.

At block 835, the external system 130 generates configuration data for the determined layout (e.g., placed-and-routed design). For example, with reference to FIG. 3A, the configuration data may include I/O configuration data for the I/O portions 205 and 210 associated with fast boot I/O, I/O configuration data for the I/O portions 215 and 220, and logic configuration data for the logic core 225.

At block 840, the external system 130 enables security for the configuration data. In an aspect, the external system 130 may generate one or more authentication certificates to allow authentication to be performed on configuration data after being loaded into configuration memory cells. In some cases, one or more authentication certificates may be generated for fast boot functionality and another one or more authentication certificates may be generated for the remaining functionality. In cases without authentication, block 840 is not performed.

In some aspects, the security may be based on keyed-hash message authentication code (HMAC) (e.g., generally faster), elliptic curve digital signature algorithm (EDCSA) (e.g., asymmetric keys), and/or others. In some cases, a certificate creator has a private key and a device holds a public key. Each authentication certificate may be or may include a bitstream digest generated based on the configuration bitstream or portion thereof. As an example, the bitstream digest may be generated by operating a secure hash algorithm (SHA) engine, such as a SHA-256 engine, on the configuration bitstream or portion thereof. In one case, one or more authentication certificates may be generated in connection with the fast boot functionality and one or more authentication certificates may be generated in connection with the remaining functionality.

At block 845, the external system 130 provides the generated configuration data to facilitate configuration and wake up of the PLD. In an aspect, the configuration data may be provided as a configuration bitstream onto bitlines to be written in corresponding configuration memory cells (e.g., configuration SRAM cells). When configuring the PLD, the configuration data may be stored in non-volatile memory (e.g., flash memory) and then loaded from the non-volatile into voltage memory of the PLD. The non-volatile memory may be in the PLD and/or external to the PLD (e.g., external hard drive, external flash drive). An example of configuring and waking up the PLD is provided with respect to FIG. 9.

Figure 9:
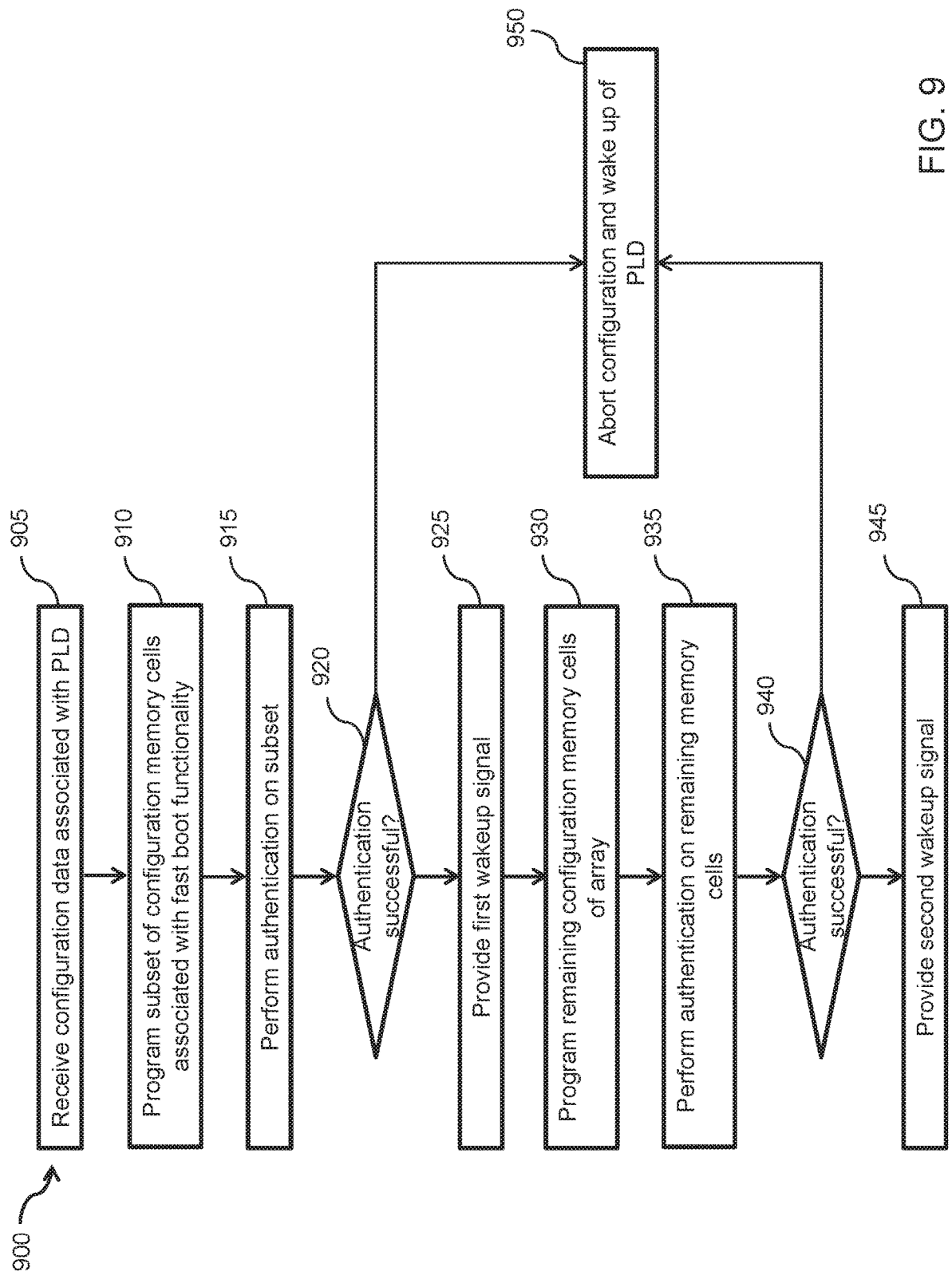
FIG. 9 illustrates a flow diagram of an example process for facilitating fast boot functionality of a PLD in accordance with an embodiment of the present disclosure.

FIG. 9 illustrates a flow diagram of an example process 900 for facilitating fast boot functionality of a PLD in accordance with an embodiment of the present disclosure. For explanatory purposes, the example process 900 is described herein with reference to the PLD 300 of FIGS. 3A-3C, although the example process 900 may be utilized with other PLDs. Note that one or more operations may be combined, omitted, and/or performed in a different order as desired.

At block 905, the processing circuit 230 receives configuration data associated with the PLD 300. The configuration data may be generated by the external system 130. In an aspect, the processing circuit 230 may obtain the configuration data from non-volatile memory of the PLD 300 (e.g., loaded into the non-volatile memory by the external system 130) that is in the PLD 300 and/or external to the PLD 300. The processing circuit 230 may receive the configuration data as part of a bitstream. In some cases, a preamble may be provided immediately before the configuration bitstream or as part of an initial sequence of bits of the configuration bitstream. The preamble may be a predetermined sequence of bits utilized as an indication of a beginning of the configuration data for the PLD 300. When security is enabled, authentication certificates may be provided along with or as part of the configuration data.

At block 910, the processing circuit 230 programs the subset of the configuration memory cells of the PLD 300 associated with fast boot functionality. The processing circuit 230 may cause the address logic circuit 235 to assert addresses associated with fast boot functionality and the data write circuit 240 to load in associated configuration data, prior to asserting addresses and loading configuration data associated with the remaining functionality (e.g., non-fast boot functionality) of the PLD 300. For example, in FIG. 3A, following the preamble, the configuration data may include configuration data frames for the I/O portions 205 and 210. As another example, in FIG. 5, following the preamble, the configuration data may include configuration data frames for the I/O portion 205, logic core portion 505, logic core portion 510, and I/O portion 210. In some cases, the order and/or shifting orientation (e.g., row-by-row or column-by-column) in which the configuration data frames are loaded into the various portions (e.g., 205, 210) may be based on speed considerations, complexity (e.g., number of data shifting and/or address shifting operations), and/or other considerations At block 915, the processing circuit 230 performs authentication of the configuration data stored in the subset of memory cells based on the corresponding authentication certificate(s). In an aspect, the authentication may be performed prior to block 915 (e.g., prior to storing the configuration data in the subset of the memory cells). For example, the authentication may be performed by running the incoming bitstream through an authentication engine, and then writing the configuration data to the subset of the memory cells. In some cases, read back and authentication (e.g., re-authentication) may be performed, although such processes may add latency. In this regard, any technique by which the configuration data that is stored or to be stored in the subset of memory cells may be determined to be intact may be utilized to authenticate the configuration data. At block 920, the processing circuit 230 determines whether authentication is successful. In cases that security is not enabled for the configuration data, blocks 915 and 920 are not performed.

If the authentication is not successful, the process 900 proceeds to block 950. At block 950, the processing circuit 230 aborts the configuration and wake up of the PLD 300. In some cases, an indication may be provided (e.g., displayed) to the user to indicate that the configuration and wake up of the PLD 300 have been aborted.

If the authentication is successful, the process 900 proceeds to block 925. The processing circuit 230 provides a wakeup signal to activate fast boot functionality. The wakeup signal may be generated by the wakeup circuit 245 of the processing circuit 230. When the fast boot functionality is activated, the PLD 300 may provide the fast boot I/O functionality, thus transitioning the associated I/O fabric of the PLD 300 from a configuration mode to a fast boot operation mode. In other PLDs, such as the PLD 500 of FIG. 5, when the fast boot functionality is activated, the PLD 500 may provide the fast boot I/O and logic functionality.

At block 930, the processing circuit 230 programs remaining configuration memory cells of the PLD 300. These remaining configuration cells are those not associated with fast boot functionality. As shown in FIGS. 3A-3C, these remaining configuration memory cells may be those in the I/O portions 215 and 220 and logic core 225.

At block 935, the processing circuit 230 performs authentication of the configuration data stored in these remaining memory cells based on the corresponding authentication certificate(s). In an aspect, the authentication may be performed prior to block 930 (e.g., prior to storing the configuration data in the remaining memory cells). More generally, in some cases, authentication procedures as described above with reference to block 915 may also apply to block 935. At block 940, the processing circuit 230 determines whether authentication is successful. In cases that security is not enabled for the configuration data, block 935 and 940 are not performed.

If the authentication is not successful, the process 900 proceeds to block 950. At block 950, the processing circuit 230 aborts the configuration and wake up of the PLD 300. If the authentication is successful, the process 900 proceeds to block 945. The processing circuit 230 provides a wakeup signal to activate functionality of the PLD 300. The fast boot I/O functionality may transition from the fast boot operation mode to a full system operation mode. The logic functionality and remaining I/O functionality may transition from the configuration mode to the full system operation mode.

In one or more embodiments, techniques are provided to facilitate fast and reliable boot for PLDs, such as FPGAs, from an image (e.g., boot image) stored on external devices (e.g., stored on non-volatile memory of external devices). In some aspects, the external device may be an external serial peripheral interface (SPI) device. Using various embodiments, effects associated with a power-on reset (PoR) trip point difference between a programmable device and the external device may be mitigated. For instance, the programmable device and the external device may power up at different times (e.g., slightly different times). If a conventional PLD starts to fetch a bitstream associated with the image too early (e.g., while the external device is still in PoR) in order to start booting the PLD, the PLD may end up with a booting failure since the fetching of the bitstream fails. If the conventional PLD uses a timer/counter to set when to start booting from the external device (e.g., to avoid fetching the bitstream too early), a latency penalty may be incurred and the boot time may be sub-optimal. For instance, the timer/counter may be set to accommodate a largest possible delay (e.g., largest delay allowed by a standard, a user, and/or an application). Although the embodiments for booting from an image are described primarily in relation to PLDs, any device (e.g., processor device) that reads a boot image from memory (e.g., non-volatile memory) to boot can utilize the techniques described herein.

Figure 10:
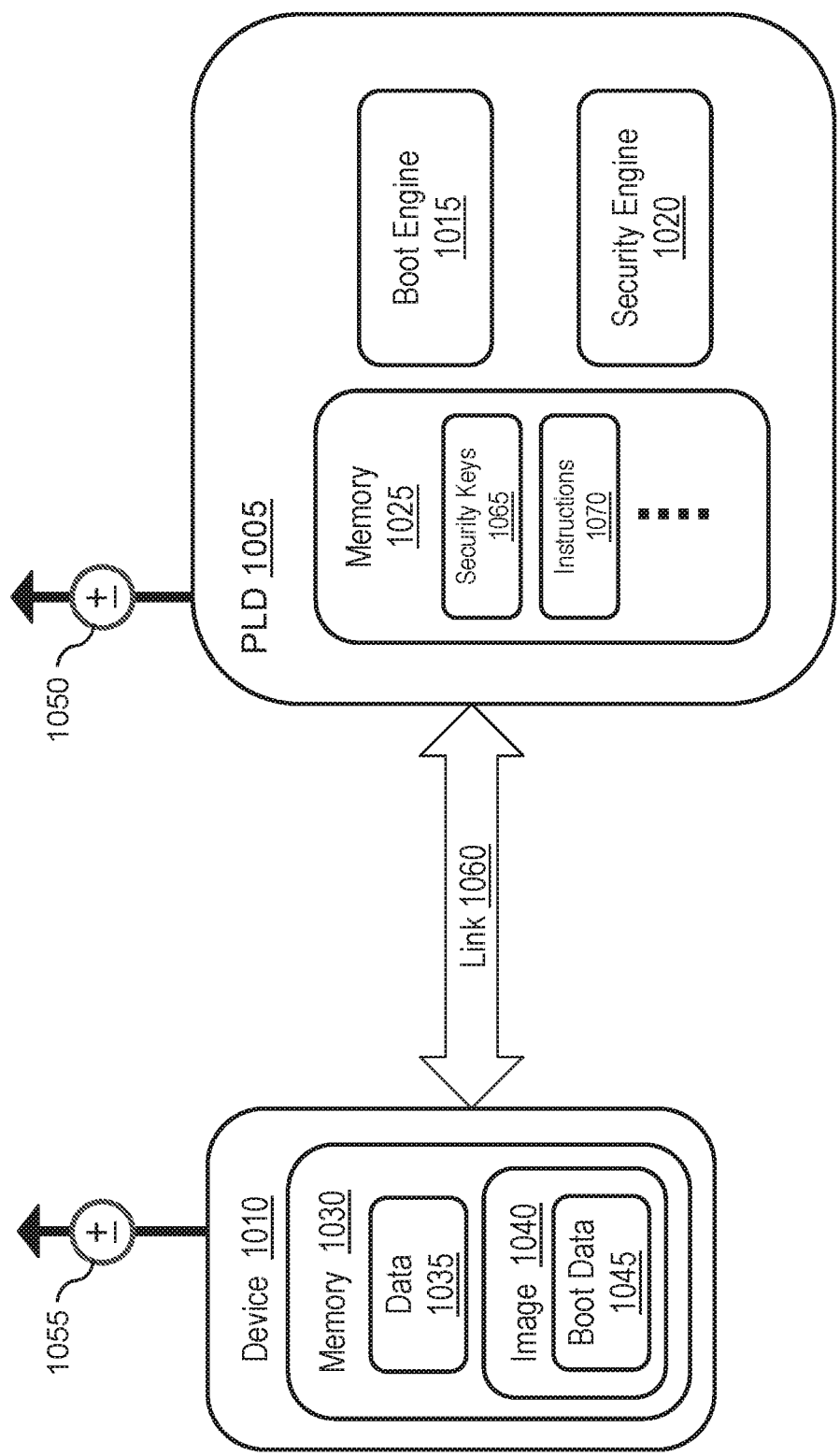
FIG. 10 illustrates a system having a PLD and an external device from which the PLD boots, in accordance with an embodiment of the present disclosure.

FIG. 10 illustrates a system having a PLD 1005 and a device 1010 from which the PLD 1005 boots, in accordance with an embodiment of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an embodiment, the PLD 1005 may be, may include, or may be a part of the PLD 100 or 200.

The PLD 1005 includes a boot engine 1015, a security engine 1020, and memory 1025 (e.g., non-volatile memory). The memory 1025 includes security keys 1065 and instructions 1070. The device 1010 includes memory 1030 (e.g., non-volatile memory) that stores data 1035 and an image 1040 (e.g., a boot image). The image 1040 includes boot data 1045. The data 1035 and the image 1040 may be used to facilitate booting of the PLD 1005. The device 1010 may be an SPI device, such as a flash device. The device 1010 may be referred to as being an external device (e.g., external relative to the PLD 1005). In this regard, the image 1040 may be referred to as an external image. It is noted that the memory 1025 may represent a single memory device or multiple memory devices of the PLD 1005 for storing data and/or the memory 1030 may represent a single memory device or multiple memory devices of the device 1010 for storing data. For instance, in one case, the data 1035 and the image 1040 may be stored in a single memory device of the device 1010. In another case, the data 1035 may be stored in a different memory device of the device 1010 from the image 1040.

The PLD 1005 and the device 1010 are powered using a power supply 1050 and a power supply 1055, respectively. Although the power supplies 1050 and 1055 are represented as two separate power supplies in FIG. 10, the power supplies 1050 and 1055 may be a single power supply shared by the PLD 1005 and the device 1010. For example, the single power supply may be a single on-chip power supply. The PLD 1005 and the device 1010 may include corresponding ports for receiving a link 1060. The PLD 1005 and the device 1010 may communicate via the link 1060. For instance, the PLD 1005 may use the link 1060 to perform read operations on the device 1010 (e.g., to obtain the data 1035). In this regard, read operations may be performed on the image 1040 to obtain the boot data 1045. In one example, the link 1060 may be an SPI bus.

The data 1035 is stored in the memory 1030 of the device 1010 and may include pre-programmed (e.g., hardcoded) data that can be read by the PLD 1005 to identify the device 1010 to the PLD 1005. In some aspects, the pre-programmed data may be, or may include, generally any data that is predetermined. In some cases, the pre-programmed data may be, or may include, an expected value(s) associated with (e.g., required by, defined in) a standard. In an aspect, the pre-programmed data may be, or may include, expected value(s) associated with a serial flash discoverable parameters (SFDP) standard. For instance, a device with the expected value(s) associated with the SFDP standard hardcoded is generally an SFDP-compliant device (e.g., or equivalently a device that supports SFDP). In some embodiments, multiple consecutive successful reads of the pre-programmed data may indicate that the image 1040 is ready to be read. A successful read may refer to a read operation on the data 1035 in which the value(s) returned by the read operation matches the expected values, as further described herein. In some aspects, the boot data 1045 of the image 1040 includes configuration data (e.g., for configuring the PLD 1005).

The boot engine 1015 may handle reading of the device 1010 (e.g., including reading of the data 1035 and the image 1040) prior to the PLD 1005 being configured with configuration data. The instructions 1065 may be hardcoded instructions to be executed by the boot engine 1015 to facilitate booting of the PLD 1005 using the image 1040. In this regard, the boot engine 1015 and the memory 1025 may collectively implement a boot loader or other persistent boot function.

Figure 11:
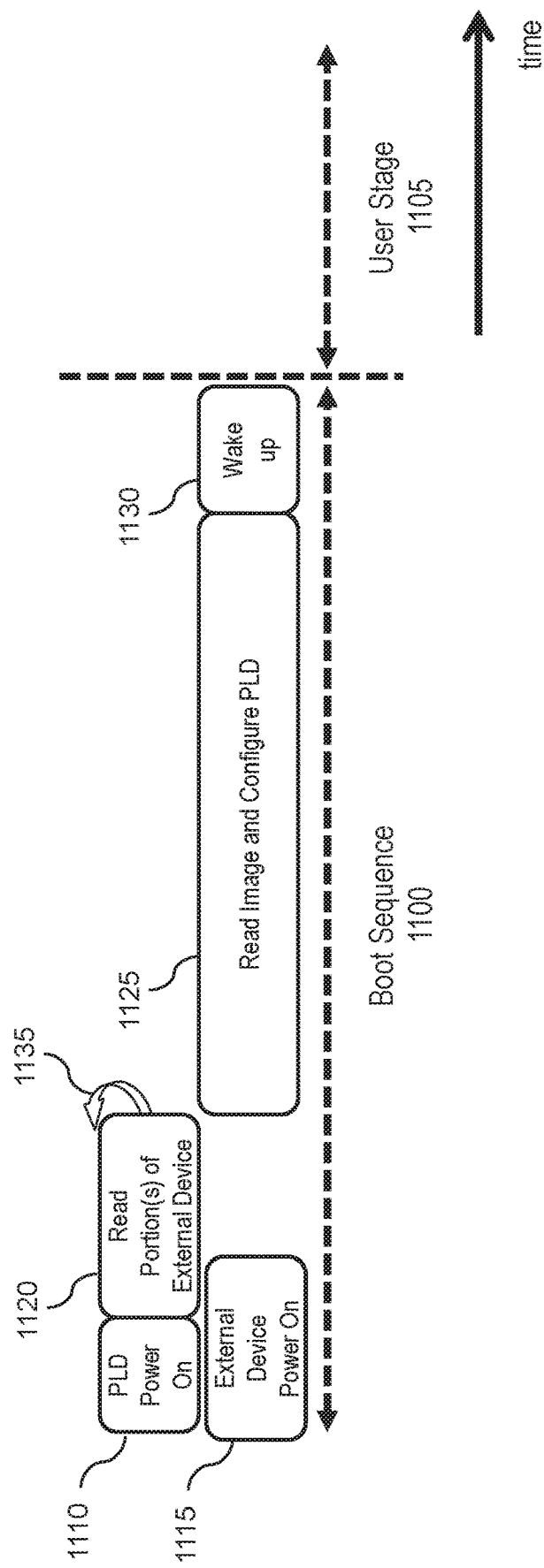
FIG. 11 illustrates a boot sequence and a user stage of a PLD in accordance with an embodiment of the present disclosure.

FIG. 11 illustrates a boot sequence 1100 and a user stage 1105 of a PLD in accordance with an embodiment of the present disclosure. In an embodiment, the PLD may be, may include, or may be a part of the PLD 1005, and/or an external device for booting the PLD may be, may include, or may be a part of the device 1010. The boot sequence 1100 includes blocks 1110, 1115, 1120, 1125, and 1130.

At block 1110, the PLD performs a power on sequence. At block 1115, the external device performs a power on sequence. At block 1120, the PLD reads a portion of the external device after power on of the PLD is complete. In an aspect, the PLD reads the data 1035 at block 1120. In some cases, at block 1120, the PLD may perform a read operation on a certain portion/location (e.g., predetermined address(es)) of the external device. With reference to FIG. 10, for instance, the PLD may perform a read operation on a certain predetermined address(es) of the memory 1030 of the device 1010) to obtain the data 1035. In some cases, at block 1120, the PLD may perform a read operation according to a specific read instruction, such as a read SFDP command.

In an embodiment, operations to be performed and instructions to be executed in order to read a portion of the external device (e.g., read a specific address(es) of the external device or read the external device according to a specific instruction/command) may be handled by a boot loader or other persistent boot function that is implemented/hardcoded in the PLD (e.g., functional without the PLD having been programmed using configuration data). In an aspect, the boot loader and/or other persistent boot function may be implemented using a boot engine (e.g., the boot engine 1015) and a non-volatile memory (e.g., the memory 1025 for storing the instructions 1070) of the PLD. In some cases, the PLD may start reading the external device immediately upon power on of the PLD. In other cases, the PLD may start reading the portion of the external device after a predetermined time delay (e.g., set by a manufacturer of the PLD, a user of the PLD, and/or a standard). As shown in FIG. 11, the PLD may start reading the portion of the external device while the external device is (e.g., other portions of the external device are) being powered on.

When power on of any given circuitry of the PLD is complete, the circuitry may be activated to perform its function. The activated circuitry may be referred to as being released. In some cases, the PLD may include circuitry to detect/monitor a voltage level associated with different circuitry provided by the PLD. When a given circuitry is at its threshold voltage level (e.g., 1.8 V for some circuitry), the circuitry may be activated to perform its function. Different circuitry provided by the PLD may be associated with different threshold voltage levels. The activation of a given circuitry may occur as soon as the circuitry's threshold voltage level is reached or after a desired delay dependent on application, user preference, standard, and/or other consideration. As such, the PLD may be implemented to proceed to read the external device as soon as the PLD is powered on, although a delay between power on and reading the external device may be implemented.

In one embodiment, the external device is SFDP compatible. Upon power on of the PLD (e.g., immediately after power on or at a certain time after power on), the PLD may attempt to read a portion of the external device using a read SFDP instruction/command. If the external device is not yet powered on (e.g., power sequence is not yet complete), the external device provides no response to the read operation of the PLD. If the external device is powered on (e.g., power sequence is complete), the external device provides values to the PLD in response to the PLD's read operation. The values may be, or may include, the data 1035 stored on the device 1010. The PLD determines whether the values provided by the external device are predetermined values expected of an SFDP-compatible device. In an aspect, the predetermined values expected of the SFDP-compatible device are defined by the SFDP standard and universally known/used by (e.g., hardcoded in) any device that is SFDP-compatible. In some cases, the PLD may perform multiple read operations (e.g., depicted by arrow 1135) on the portion of the external device to facilitate booting of the PLD. For example, the PLD may determine the boot image is to be read (e.g., ready to be read) if the expected values are read (e.g., using the read SFDP instruction) from the external device at least a consecutive number of times.

In an aspect, a determination that the boot image is to be read may also be referred to as a determination to initiate reading of the boot image. In some cases, once the PLD has received the expected values in consecutive read operations, the PLD is determined to be able to (e.g., have a high probability) successfully read an entirety of the boot data from the image such that PLD can successfully boot using the image (e.g., without getting a bad read of the image and needing to abort and restart/retry/recover the booting). As an example, the PLD may determine that the boot image is to be read if two consecutive reads (e.g., N=2, where N is the number of required consecutive reads) of the portion of the external device return the same expected values. As another example, the PLD may determine that the boot image is to be read if four consecutive reads (e.g., N=4) of the portion of the external device return the same expected values. A counter may be reset (e.g., set to 0) if the expected values are not received. Other values of N may be used. A higher number for N may be associated with a higher probability of correctly determining that the boot image is ready to be read as well as higher latency.

Relative to reading a single time, reading multiple times may help avoid a false positive determination (e.g., determining the boot image is ready to be read when it is in fact not ready to be read). Reading multiple times may avoid effects due to glitches in the values read from the boot image. For example, sudden power level changes (e.g., power dips and/or power spikes associated with a power supply) to the PLD (or portions thereof) may cause a certain bit to be interpreted as a 1 when the bit is a 0, or vice versa. The number of consecutive times the expected values need to be received by the PLD from the external device via the read operations may be based on application, PLD manufacture's settings, and/or PLD user's settings. In some cases, a power distribution structure having high complexity may be associated with setting N to higher values.

In one embodiment, the external device is not SFDP compatible. Upon power on of the PLD, the PLD may attempt to read a portion of the boot image. For example, the PLD may read from a known address (e.g., address 0) of the external device (e.g., the memory 1030 of the device 1010) for pre-programmed known data values. The read operation may be handled by a boot loader or other persistent boot function hardcoded in the PLD. The known address and the known data values (e.g., expected data values to be used for comparison with values read from the external device) may be hardcoded in the PLD. If the external device is not yet powered on, the external device provides no response to the read operation of the PLD. If the external device is powered on, the external device provides values to the PLD in response to the PLD's read operation. The values read by the PLD may be, or may include, the data 1035 stored on the device 1010. The PLD determines whether the values provided by the external device are the known data values expected by the PLD. In this regard, the PLD may be designed for use with external devices having certain data values stored at certain addresses. The predetermined values may generally be any values, so long as the values are not the same as other predetermined values (e.g., predetermined values set by other standards, such as the SFDP standard). For example, the PLD may determine the boot image is to be read (e.g., ready to be read) if the expected values are obtained by reading from the known address of the external device a consecutive number of times.

In one embodiment, the PLD (e.g., a boot engine and configuration engine) supports both SFDP compatible devices as well as devices that are not SFDP compatible. Upon power on of the PLD, the PLD may attempt to read portions of the external device. The read operation may be handled by a boot loader or other persistent boot function hardcoded in the PLD. If the external device is not yet powered on, the external device provides no response to the read operation of the PLD. If the external device is powered on, the external device provides values according to different types of read operations. Each type of read operation may be associated with a respective expected value(s). As an example, in a first type of read operation, the PLD may read from a known address (e.g., address 0) for pre-programmed known data values. In a second type of read operation, the PLD may read the external device by performing a read SFDP instruction/command. The PLD may determine the boot image is to be read (e.g., ready to be read) if consecutive reads from the known address return the pre-programmed known data values. The PLD may also determine the boot image is to be read (e.g., ready to be read) if consecutive read SFDP instructions/commands return the expected values associated with the SFDP standard. In some cases, the PLD may alternate between reading from the known address and performing the read SFDP instruction. Although the foregoing describes an example with two types of read operations, the PLD may perform more than two types of read operations.

At block 1125, after the boot image is determined to be ready to be read (e.g., N=2 consecutive reads returned the expected values), the PLD proceeds with reading (e.g., downloading) the configuration data from the boot image and is configured using the configuration data. To configure (e.g., program) the PLD (e.g., its I/O fabric and the logic fabric), the configuration data can be provided as a configuration bitstream that is loaded serially or in parallel into configuration memory cells of the PLD. At block 1130, a wakeup signal is provided to activate functionality of the PLD. After functionality of the PLD is activated, the PLD is in a user stage (e.g., a functional mode) and can be used to perform ifs intended I/O and logic functionality.

Figure 12:
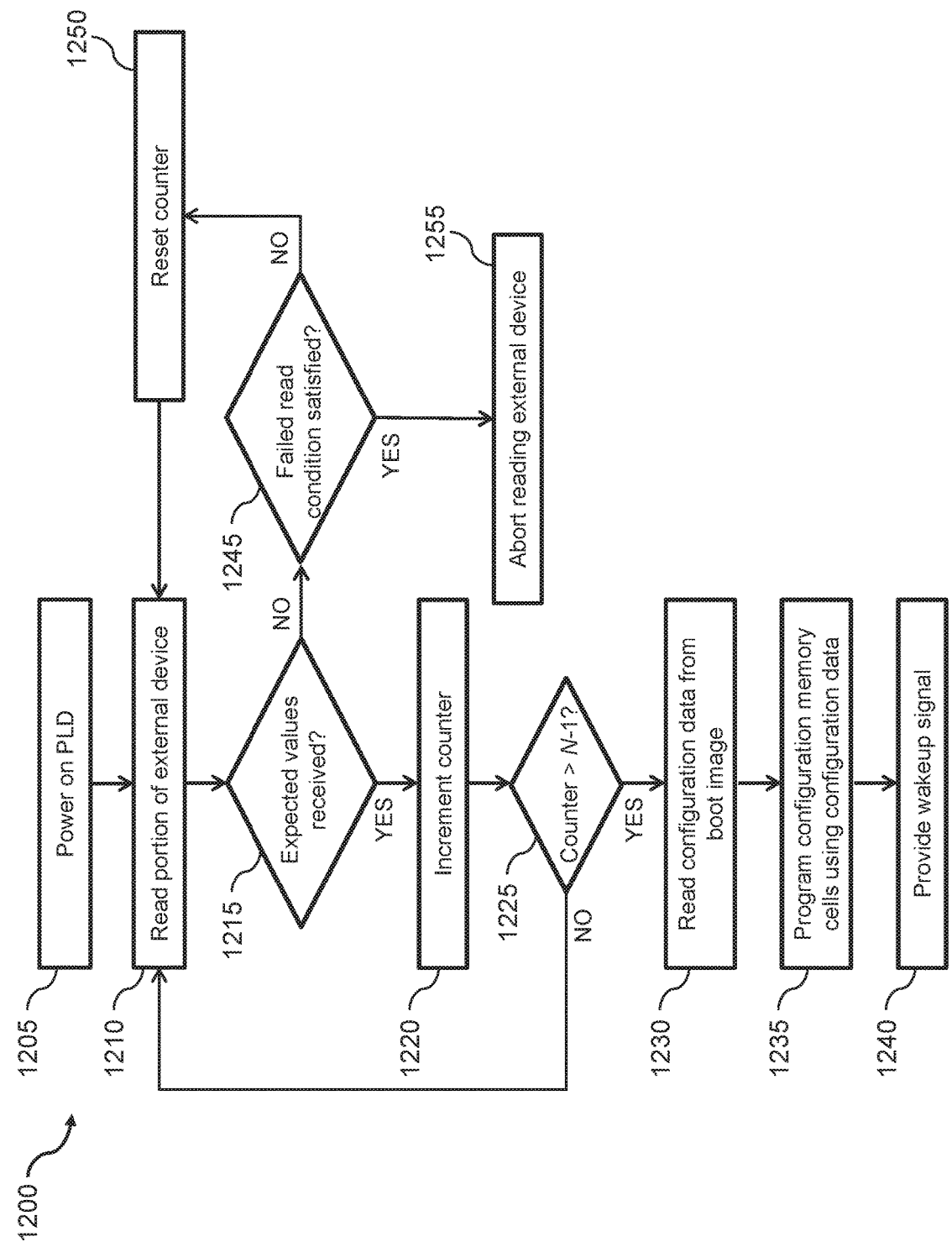
FIG. 12 illustrates a flow diagram of an example process for facilitating booting of a PLD in accordance with an embodiment of the disclosure.

FIG. 12 illustrates a flow diagram of an example process 1200 for facilitating booting of a PLD using a boot image stored on an external device in accordance with an embodiment of the disclosure. For explanatory purposes, the example process 1200 is described herein with reference to the PLD 200 of FIG. 2, although the example process 1200 may be utilized with other PLDs. Note that one or more operations may be combined, omitted, and/or performed in a different order as desired.

At block 1205, the processing circuit 230 performs a power on sequence for the PLD 200. At block 1210, the processing circuit 230 reads a portion of an external device (e.g., the device 1010) after power on of the PLD 200 is complete. For example, the processing circuit 230 may perform a read operation at a certain predetermined address (es) of the external device (e.g., a certain predetermined address(es) of the memory 1030 of the device 1010) to obtain the data 1035. As another example, the processing circuit 230 may perform a read SFDP instruction/command to obtain the data 1035. Expected values may be values required by the SFDP standard or other pre-programmed values (e.g., at known addresses). In an aspect, operations to be performed and instructions to be executed in order to read the portion of the external device may be handled by a boot loader or other persistent boot function that is implemented/hardcoded in the PLD 200. In some cases, the processing circuit 230 may start reading the portion of the external device immediately upon power on of the PLD 200. In some cases, the processing circuit 230 may start reading the portion of the boot image after a predetermined time delay. The processing circuit 230 may start reading the portion of the external device while the external device is (e.g., other portions of the external device are) being powered on.

At block 1215, the processing circuit 230 determines whether the expected values have been received from reading the external device. The determination may be made based on comparing the expected values with the values read from the portion of the external device. If the determination at block 1215 is that the expected values have been received, the process 1200 proceeds to block 1220. At block 1220, the processing circuit 230 increments a counter value. The counter value may be used to track a consecutive number of times that the expected values have been received. The counter value may be implemented by a counter of the PLD 200 (e.g., in the boot engine). At block 1225, the processing circuit 230 determines whether the counter value exceeds N−1, where N is the consecutive number of times that the expected values needs to have been received in response to the read operations performed at block 1210 in order for the boot image to be determined to be read (e.g., determined to be ready to be read). If the counter value does not exceed N−1, the process 1200 proceeds to block 1210, in which the same portion of the external device is read again.

If the counter exceeds N−1 (e.g., counter is at value N), the process 1200 proceeds to block 1230. At block 1230, the processing circuit 230 reads the boot image to receive configuration data associated with the PLD 200. The processing circuit 230 may receive the configuration data as part of a bitstream that is loaded serially or in parallel into configuration memory cells of the PLD 200. In some cases, a preamble may be provided immediately before the configuration bitstream or as part of an initial sequence of bits of the configuration bitstream. The preamble may be a predetermined sequence of bits utilized as an indication of a beginning of the configuration data for the PLD 200. In some cases, reading/downloading of the configuration data from the boot image may be controlled by a state machine.

At block 1235, the processing circuit 230 programs the configuration memory cells of the PLD 200. Such programming may be part of a pre-programming of the PLD 200, programming on-the-fly for the PLD 200, reprogramming of the PLD 200, or generally any programming of the PLD 200 to program the PLD 200 using the configuration data of the boot image. The processing circuit 230 may cause the address logic circuit 235 to assert addresses and the data write circuit 240 to load in associated configuration data. In some cases, order and/or shifting orientation (e.g., row-by-row or column-by-column) in which the configuration data frames are loaded into various portions of the PLD 200 may be based on speed considerations, complexity (e.g., number of data shifting and/or address shifting operations), and/or other considerations. At block 1240, the processing circuit 230 provides a wakeup signal to activate functionality of the PLD 200. The wakeup signal may be generated by the wakeup circuit 245 of the processing circuit 230. When the PLD 200 is activated, the PLD 200 transitions from a configuration mode to a functional mode to provide I/O and logic functionality.

If the determination at block 1215 is that the expected values have not been received, the process 1200 proceeds to block 1245. At block 1245, the processing circuit 230 determines whether a failed read condition has been satisfied. In an aspect, the failed read condition may occur when the processing circuit 230 is unable to determine that the boot image is ready to be read after a certain number of attempts. For example, each time the counter value is reset may count as one attempt. In another aspect, the processing circuit 230 may read the portion of the external device indefinitely. In such an aspect, the failed read condition may be satisfied when reading of the portion of the external device by the processing circuit 230 is aborted (e.g., manually aborted by a user). If the determination at block 1245 is that the failed read condition has not been satisfied, the process 1200 proceeds to block 1250. At block 1250, the processing circuit 230 resets the counter value to zero. The process 1200 then proceeds to block 1210, in which the processing circuit 230 again reads the portion of the external device. If the determination at block 1245 is that the failed read condition has been satisfied, the process 1200 proceeds to block 1255. At block 1255, the processing circuit 230 aborts reading the external device. In this regard, the failed read condition being satisfied is indicative of the processing circuit 230 being unable to determine the boot image to be ready to be read.

In some embodiments, the configuration data may have security enabled. When security is enabled, authentication certificates may be provided along with or as part of the configuration data. The processing circuit 230 may perform authentication of the configuration data stored in the memory cells based on corresponding authentication certificate(s). In some cases, the authentication may be performed by running the incoming bitstream through an authentication engine, and then writing the configuration data to the memory cells. In some cases, read back and authentication (e.g., re-authentication) may be performed, although such processes may add latency. If the authentication is not successful, the processing circuit 230 may abort the configuration and wake up of the PLD 200. In some cases, an indication may be provided (e.g., displayed) to the user to indicate that the configuration and wake up of the PLD 200 have been aborted. If the authentication is successful, the processing circuit 230 may provide a wakeup signal to activate functionality of the PLD 200.

The process 1200 of FIG. 12 provides a booting sequence in which a single counter value is used to track a consecutive number of times expected values have been successfully read from the external device. In one example, the counter value may be used to track a consecutive number of times that expected values associated with the SFDP standard have been successfully read from the external device. In another example, the counter value may be used to track a consecutive number of times that expected values at certain addresses have been successfully read from the external device.

In one embodiment, multiple counter values may be utilized to allow the PLD to support different types of devices. For instance, the PLD (e.g., a boot engine and configuration engine) may support both SFDP compatible devices as well as devices that are not SFDP compatible.

Figure 13:
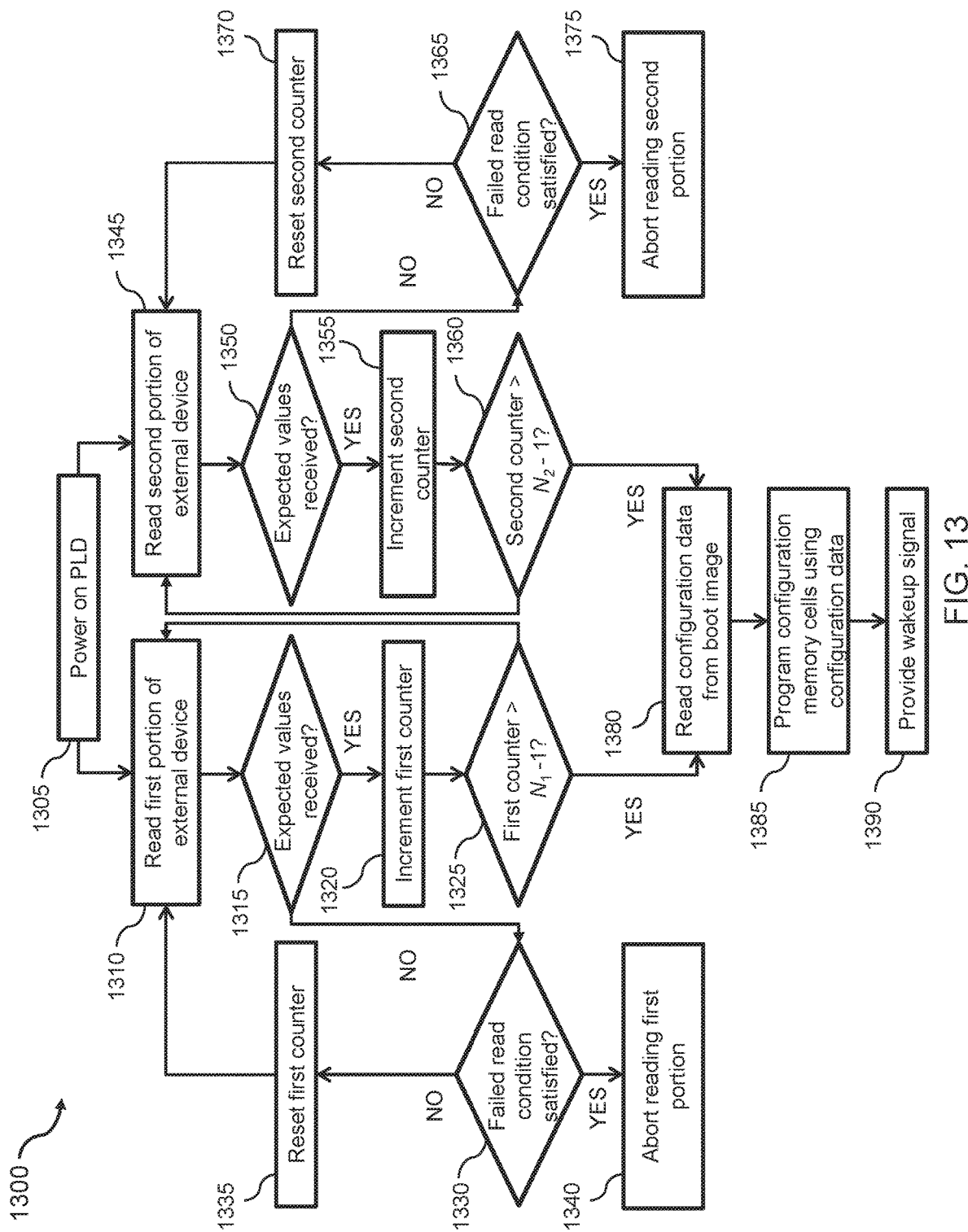
FIG. 13 illustrates a flow diagram of an example process for facilitating booting of a PLD in accordance with an embodiment of the disclosure.

FIG. 13 illustrates a flow diagram of an example process 1300 for facilitating booting of a PLD using a boot image stored on an external device in accordance with an embodiment of the disclosure. For explanatory purposes, the example process 1300 is described herein with reference to the PLD 200 of FIG. 2, although the example process 1300 may be utilized with other PLDs. Note that one or more operations may be combined, omitted, and/or performed in a different order as desired. The description of FIG. 12 generally applies to FIG. 13, with examples of differences between FIGS. 12 and 13 and other description provided herein.

At block 1305, the processing circuit 230 performs a power on sequence for the PLD 200. At block 1310, the processing circuit 230 reads a first portion of an external device (e.g., the device 1010) after power on of the PLD 200 is complete. For example, expected values for the read operation may be values required by the SFDP standard. In an aspect, reading a first portion of the external device may be referred to as performing a first type of reading operation on the external device. At block 1315, the processing circuit 230 determines whether the expected values have been received.

If the determination at block 1315 is that the expected values have been received, the process 1300 proceeds to block 1320. At block 1320, the processing circuit 230 increments a first counter value. The first counter value may be used to track a consecutive number of times that the expected values have been received. At block 1325, the processing circuit 230 determines whether the first counter value exceeds $N_1-1$, where $N_1$ is the consecutive number of times that the expected values need to have been received in response to the read operations performed at block 1310 in order for the boot image to be determined to be ready to be read based on the first portion of the external device. If the first counter value does not exceed $N_1-1$, the process 1300 proceeds to block 1310, in which the first portion of the external device is read again.

If the first counter value exceeds $N_1-1$, the process 1300 proceeds to block 1380. At block 1380, the processing circuit 230 reads the boot image stored on the external device to receive configuration data associated with the PLD 200. The processing circuit 230 may receive the configuration data as part of a bitstream that is loaded serially or in parallel into configuration memory cells of the PLD 200. At block 1385, the processing circuit 230 programs the configuration memory cells of the PLD 200 using the configuration data. At block 1390, the processing circuit 230 provides a wakeup signal to activate functionality of the PLD 200. When the PLD 200 is activated, the PLD 200 transitions from a configuration mode to a functional mode to provide I/O and logic functionality.

If the determination at block 1315 is that the expected values have not been received, the process 1300 proceeds to block 1330. At block 1330, the processing circuit 230 determines whether a failed read condition has been satisfied. In an aspect, the failed read condition may occur when the processing circuit 230 is unable to determine that the boot image is ready to be read in relation to the first counter value after a certain number of attempts. For example, each time the first counter value is reset may count as one attempt. In another aspect, the processing circuit 230 may read the first portion of the external device indefinitely. In such an aspect, the failed read condition may be satisfied when reading of the first portion of the external device by the processing circuit 230 is aborted (e.g., manually aborted by a user). If the determination at block 1330 is that the failed read condition has not been satisfied, the process 1300 proceeds to block 1335. At block 1335, the processing circuit 230 resets the first counter value to zero. The process 1300 then proceeds to block 1310, in which the processing circuit 230 again reads the first portion of the external device. If the determination at block 1330 is that the failed read condition has been satisfied, the process 1300 proceeds to block 1340. At block 1340, the processing circuit 230 aborts reading the first portion of the external device (e.g., aborts performing of the first type of reading operations). In this regard, the failed read condition being satisfied is indicative of the processing circuit 230 being unable to determine the boot image is ready to be read based on the first portion of the boot image. For example, if the first counter value is associated with a number of times an SFDP expected value is read (e.g., using read SFDP instructions), a device may be determined to not be SFDP compliant if the failed read condition is satisfied. In this example, reading a first portion of the external device may include using a read SFDP instruction/command to attempt to find expected values required to be stored on the external device by the SFDP standard.

At block 1345, the processing circuit 230 reads a second portion of the external device after power on of the PLD 200 is complete. For example, expected values for the read operation may generally be any pre-programmed values. In an aspect, reading a second portion of the external device may be referred to as performing a second type of reading operation on the external device. At block 1350, the processing circuit 230 determines whether the expected values have been received.

If the determination at block 1350 is that the expected values have been received, the process 1300 proceeds to block 1355. At block 1355, the processing circuit 230 increments a second counter value. The second counter value may be used to track a consecutive number of times that the expected values have been received. At block 1355, the processing circuit 230 determines whether the second counter value exceeds $N_2-1$, where $N_2$ is the consecutive number of times that the expected values need to have been received in response to the read operations performed at block 1345 in order for the boot image to be determined to be read (e.g., determined to be ready to be read) valid based on the second portion of the external device. In some cases, $N_1=N_2$. If the second counter value does not exceed $N_2-1$, the process 1300 proceeds to block 1345, in which the second portion of the external device is read again. If the counter exceeds $N_2-1$, the process 1300 proceeds to block 1380.

If the determination at block 1360 is that the expected values have not been received, the process 1300 proceeds to block 1365. At block 1365, the processing circuit 230 determines whether a failed read condition associated with the second counter value has been satisfied. In an aspect, the failed read condition may occur when the processing circuit 230 is unable to determine that the boot image is ready to be read in relation to the second counter value after a certain number of attempts. In another aspect, the processing circuit 230 may read the second portion of the external device indefinitely. In such an aspect, the failed read condition may be satisfied when reading of the second portion of the external device by the processing circuit 230 is aborted (e.g., manually aborted by a user). If the determination at block 1365 is that the failed read condition has not been satisfied, the process 1300 proceeds to block 1370. At block 1370, the processing circuit 230 resets the second counter value to zero. The process then proceeds from block 1370 to block 1345, in which the processing circuit 230 again reads the second portion of the external device. If the determination at block 1365 is that the failed read condition has been satisfied, the process 1300 proceeds to block 1375. At block 1375, the processing circuit 230 aborts reading the second portion of the external device (e.g., aborts performing of the second type of read operations).

In an embodiment, the first counter value may be associated with a consecutive number of times that values expected from an SFDP-compliant device are received, and the second counter value may be associated with a consecutive number of times that pre-programmed values at a known address are received. The processing circuit 230 may alternate between reading the first portion of the external device and reading the second portion of the external device. As such, in this embodiment, the PLE 200 supports SFDP compatible devices and devices that are not SFDP compatible.

Although the process 1300 allows the PLD 200 to support two different types of devices (e.g., SFDP-compliant devices and non-SFDP-compliant devices), in other embodiments more than two different types of devices may be supported by the PLD 200. For example, more than two counter values may be used, such that each counter value is associated with one type of device. Furthermore, although the processes 1200 and 1300 describe counter values that are each incremented and compared with a respective predetermined number (e.g., $N_1$ and $N_2$ in FIG. 13) to determine whether the counter value exceeds the respective predetermined number, other manners to use/implement the counter values may be utilized. For example, rather than incrementing a counter value by one, other manners by which to adjust a counter value may include decrementing by one starting from the maximum counter value (e.g., $N_1$ and $N_2$ in FIG. 13) and comparing the counter value to 0 to determine whether the consecutive successful reads occurred.

Figure 14:
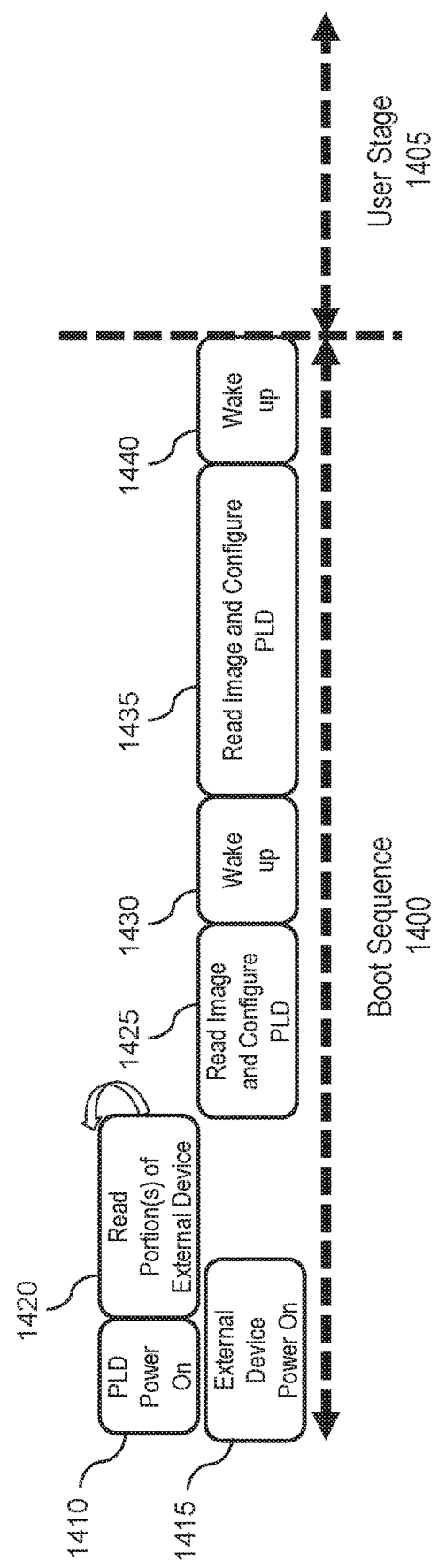
FIG. 14 illustrates a boot sequence and a user stage of a PLD in accordance with one or more embodiments of the present disclosure.

FIG. 14 illustrates a boot sequence 1400 and a user stage 1405 of a PLD in accordance with one or more embodiments of the present disclosure. In an embodiment, the PLD may be, may include, or may be a part of the PLD 1005, and/or an external device for booting the PLD may be, may include, or may be a part of the device 1010. The boot sequence 1400 includes blocks 1410, 1415, 1420, 1425, 1430, 1435, and 1440. The description of FIG. 11 generally applies to FIG. 14, with examples of differences between FIGS. 11 and 14 and other description provided herein.

At block 1410, the PLD performs a power on sequence. At block 1415, the external device performs a power on sequence. At block 1420, the PLD reads one or more portions of the external device (e.g., the device 1010) after power on of the PLD is complete. In one example, the PLD may read a first portion and a second portion to determine whether or not the external device that stores the boot image is SFDP compatible.

At block 1425, after the boot image is determined to be ready to be read (e.g., N=2 consecutive reads returned the expected values), the PLD proceeds with reading (e.g., downloading) a portion of the configuration data from the boot image and is configured using the portion of the configuration data. In an embodiment, the portion of the configuration data may correspond to a portion of the I/O fabric and/or logic fabric of the PLD that is designated for fast boot. At block 1430, a wakeup signal is provided to activate functionality of the PLD associated with the portion of the configuration data.

At block 1435, the PLD proceeds with reading (e.g., downloading) a remaining portion(s) of the configuration data from the boot image and is configured using the remaining portion(s) of the configuration data. At block 1440, a wakeup signal is provided to activate functionality of the PLD associated with the remaining portion(s) of the configuration data. In some aspects, at block 1440, portions of the I/O fabric and/or logic fabric operating in fast boot operation mode may transition to the full system operation mode. Remaining functionality, may transition from the configuration mode to the full system operation mode. In an embodiment, blocks 1425, 1430, 1435, and 1440 may be implemented using one or more blocks of the process 900 of FIG. 9.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

The invention claimed is:

1. A method for programming a programmable logic device (PLD), the method comprising:
   prior to performing, by the PLD, any read operation on a boot image stored on a first portion of a non-volatile memory after power on of the PLD, wherein the boot image comprises configuration data for programming the PLD:
      performing, by the PLD, a read operation on a second portion of the non-volatile memory different from the first portion to obtain a first value;
      comparing, by the PLD, the first value to a first predetermined value to obtain a first comparison result to determine whether the boot image stored on the non-volatile memory is ready to be read by the PLD, wherein the first predetermined value comprises a value associated with the serial flash discoverable parameters (SFDP) standard; and
      determining, by the PLD, whether the boot image stored on the non-volatile memory is ready to be read from the non-volatile memory by the PLD based at least on the first comparison result;
   if the boot image is determined to not be ready to be read by the PLD from the non-volatile memory, subsequently repeating the performing, the comparing, and the determining;
   if the boot image is determined to be ready to be read by the PLD from the non-volatile memory, performing, by the PLD, a read operation on the boot image to obtain the configuration data; and
   programming, by the PLD, configuration memory cells of the PLD based at least on the configuration data.

2. The method of claim 1, wherein the first predetermined value is stored at a predetermined address of the non-volatile memory, and wherein the first comparison result is indicative of a completion status of a power sequence associated with the non-volatile memory.

3. The method of claim 1, further comprising initiating power on of the PLD during power on of a device that includes the non-volatile memory, wherein the performing the read operation on the second portion of the non-volatile memory is performed by the PLD immediately after power on of the PLD is complete.

4. The method of claim 1, wherein the read operation on the second portion is a first read operation, the method further comprising:
   prior to performing any read operation on the boot image after power on of the PLD, performing a second read operation on the second portion of the non-volatile memory to obtain a second value; and
   comparing the second value to the first predetermined value to obtain a second comparison result to determine whether the boot image stored on the non-volatile memory is ready to be read by the PLD,
   wherein the determining whether the boot image is ready to be read from the non-volatile memory by the PLD is further based on the second comparison result.

5. The method of claim 4, further comprising:
   adjusting a counter value based on each of the first comparison result and the second comparison result to obtain an adjusted counter value; and
   comparing the adjusted counter value and a threshold value to obtain a third comparison result, wherein the first read operation and the second read operation are consecutive read operations on the second portion of the non-volatile memory, and wherein the determining whether the boot image is ready to be read from the non-volatile memory by the PLD is based on the third comparison result.

6. The method of claim 1, wherein the boot image is determined to be ready to be read when a value obtained from each of at least a number of consecutive read operations on the second portion of the non-volatile memory matches the first predetermined value.

7. The method of claim 1, further comprising:
   performing a read operation on a third portion of the non-volatile memory to obtain a second value, wherein the third portion is different from the second portion; and
   comparing the second value to a second predetermined value to obtain a second comparison result to determine whether the boot image stored on the non-volatile memory is ready to be read by the PLD,
   wherein the determining is further based on the second comparison result.

8. The method of claim 7, further comprising:
   adjusting a first counter value based on the first comparison result to obtain an adjusted first counter value;
   adjusting a second counter value based on the second comparison result to obtain an adjusted second counter value;
   comparing the adjusted first counter value and a first threshold value to obtain a third comparison result; and
   comparing the adjusted second counter value and a second threshold value to obtain a fourth comparison result, wherein the read operation on the second portion and the read operation on the third portion are consecutive read operations on the non-volatile memory, and wherein the determining whether the boot image is ready to be read from the non-volatile memory by the PLD is based on the third comparison result and the fourth comparison result.

9. The method of claim 1, wherein:
   the boot image is determined, by the PLD, to be ready to be read by the PLD when the first value matches the first predetermined value;
   the configuration memory cells are associated with at least a portion of the PLD; and
   the method further comprises providing at least one wakeup signal to wake up functionality associated with the PLD.

10. The method of claim 1, wherein:
    the programming comprises:
       programming a first portion of the PLD with a first portion of the configuration data;
       programming a second portion of the PLD with a second portion of the configuration data;
    the method further comprises:
       providing a first wakeup signal to wake up functionality associated with the first portion of the PLD; and providing a second wakeup signal to wake up functionality associated with the second portion of the PLD.

11. A programmable logic device (PLD) comprising:
an array of configuration memory cells;
a processing circuit configured to:
prior to performing any read operation on a boot image stored on a first portion of a non-volatile memory after power on of the PLD, wherein the boot image comprises configuration data for programming the PLD:
perform a read operation on a second portion of the non-volatile memory different from the first portion to obtain a first value;
compare the first value to a first predetermined value to obtain a first comparison result to determine whether the boot image stored on the non-volatile memory is ready to be read by the PLD, wherein the first predetermined value comprises a value associated with the serial flash discoverable parameters (SFDP) standard; and
determine whether the boot image stored on the non-volatile memory is ready to be read from the non-volatile memory by the PLD based at least on the first comparison result;
if the boot image is determined to not be ready to be read by the PLD from the non-volatile memory, subsequently repeat the performing, the comparing, and the determining;
if the boot image is determined to be ready to be read by the PLD from the non-volatile memory, perform a read operation on the boot image to obtain the configuration data; and
program the array of configuration memory cells based at least on the configuration data.

12. The PLD of claim 11, wherein the first comparison result is indicative of a completion status of a power sequence associated with the non-volatile memory, wherein the first predetermined value is stored at a predetermined address of the non-volatile memory, wherein the processing circuit is further configured to initiate power on of the PLD, and wherein the processing circuit is configured to perform the read operation on the second portion of the non-volatile memory immediately after power on of the PLD is complete.

13. The PLD of claim 11, wherein the read operation on the second portion is a first read operation, wherein the processing circuit is further configured to:
perform a second read operation on the second portion of the non-volatile memory to obtain a second value; and
compare the second value to the first predetermined value to obtain a second comparison result to determine whether the boot image stored on the non-volatile memory is ready to be read by the PLD,
wherein the determining whether the boot image is ready to be read from the non-volatile memory by the PLD is further based on the second comparison result.

14. The PLD of claim 13, wherein:
the processing circuit is further configured to:
adjust a counter value based on each of the first comparison result and the second comparison result to obtain an adjusted counter value; and
compare the adjusted counter value and a threshold value to obtain a third comparison result;
the processing circuit is configured to determine whether the boot image is ready to be read from the non-volatile memory by the PLD based on the third comparison result; and
the first read operation and the second read operation are consecutive read operations on the second portion of the non-volatile memory.

15. The PLD of claim 11, wherein the boot image is determined to be ready to be read when a value obtained from each of at least a number of consecutive read operations on the second portion of the non-volatile memory matches the first predetermined value.

16. The PLD of claim 11, wherein the processing circuit is further configured to:
perform a read operation on a third portion of the non-volatile memory to obtain a second value, wherein the third portion is different from the second portion; and
compare the second value to a second predetermined value to obtain a second comparison result to determine whether the boot image stored on the non-volatile memory is ready to be read by the PLD,
wherein the processing circuit is configured to determine whether the boot image is ready to be read based further on the second comparison result.

17. The PLD of claim 16, wherein:
the processing circuit is further configured to:
adjust a first counter value based on the first comparison result to obtain an adjusted first counter value;
adjust a second counter value based on the second comparison result to obtain an adjusted second counter value;
compare the adjusted first counter value and a first threshold value to obtain a third comparison result; and
compare the adjusted second counter value and a second threshold value to obtain a fourth comparison result;
the processing circuit is configured to determine whether the boot image is ready to be read from the non-volatile memory by the PLD is based on the third comparison result and the fourth comparison result; and
the read operation on the second portion and the read operation on the third portion are consecutive read operations on the non-volatile memory.

18. The PLD of claim 11, wherein:
the processing circuit is further configured to:
provide at least one wakeup signal to wake up functionality associated with the PLD.

19. The PLD of claim 18, wherein:
the processing circuit is configured to program the array by:
programming a first subset of the configuration memory cells with a first portion of the configuration data;
programming a second subset of the configuration memory cells with a second portion of the configuration data;
the processing circuit is further configured to:
provide a first wakeup signal to wake up functionality associated with the first subset of the configuration memory cells; and
provide a second wakeup signal to wake up functionality associated with the second subset of the configuration memory cells.

* * * * *